US012718779B2

(12) United States Patent
Nakagawa

(10) Patent No.: US 12,718,779 B2
(45) Date of Patent: Aug. 25, 2026

(54) DISPLAY DEVICE

(71) Applicant: Sharp Display Technology Corporation, Kameyama City (JP)

(72) Inventor: Hidetoshi Nakagawa, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/094,288

(22) Filed: Mar. 28, 2025

(65) Prior Publication Data

US 2025/0308480 A1 Oct. 2, 2025

(30) Foreign Application Priority Data

Apr. 2, 2024 (JP) ................................ 2024-059359

(51) Int. Cl.
*G09G 3/36* (2006.01)

(52) U.S. Cl.
CPC ... *G09G 3/3677* (2013.01); *G09G 2300/0426* (2013.01); *G09G 2310/0286* (2013.01); *G09G 2330/06* (2013.01)

(58) Field of Classification Search
None
See application file for complete search history.

(56) References Cited

U.S. PATENT DOCUMENTS

2012/0229712 A1 9/2012 Yoshida et al.
2015/0115271 A1* 4/2015 Yoon ...................... H10D 86/60 257/72
2015/0372025 A1 12/2015 Misaki
2016/0131933 A1 5/2016 Yoshida et al.
2019/0033648 A1 1/2019 Yoshida et al.
2021/0103176 A1 4/2021 Yoshida et al.
2021/0311578 A1* 10/2021 Tominaga ............. G02F 1/1368
2025/0218412 A1* 7/2025 Chen .................... G09G 3/3677
2025/0271717 A1* 8/2025 Zang ..................... G02F 1/1368

FOREIGN PATENT DOCUMENTS

WO 2011/067963 A1 6/2011
WO 2014/115810 A1 7/2014

* cited by examiner

*Primary Examiner* — Parul H Gupta
(74) *Attorney, Agent, or Firm* — ScienBiziP, P.C.

(57) ABSTRACT

A display device includes a first trunk line extending in a column direction and included in a first conductive layer, a first branch wiring line connected to the first trunk line and included in a second conductive layer, a first contact hole through which a first portion of the first trunk line is exposed, and a third contact hole through a third portion of a conductive portion included in the first conductive layer is exposed, wherein, in the row direction, a range of the third portion overlaps a range of the first trunk line, in the column direction, a range of the third portion overlaps a range of the first trunk line, and an electric resistance value between the third portion and the first branch wiring line is higher than an electric resistance value between the first portion of the first trunk line and the first branch wiring line.

22 Claims, 28 Drawing Sheets

DISPLAY DEVICE

CROSS-REFERENCE TO RELATED APPLICATIONS

This application claims the benefit of priority to Japanese Patent Application Number 2024-059359 filed on Apr. 2, 2024. The entire contents of the above-identified application are hereby incorporated by reference.

BACKGROUND

Technical Field

This disclosure relates to a display device.

Liquid crystal display panels are used in liquid crystal display devices for various applications, such as mobile terminals and televisions. Narrowing frames for liquid crystal display panels is required not only from the viewpoint of reducing manufacturing costs but also from the viewpoint of design and functionality. By using a gate driver monolithic (GDM) technique in which a gate drive circuit (also referred to as a "gate driver") is integrally formed on a TFT substrate, it is possible to reduce the cost for driver mounting and narrow the frame as compared to a case in which the gate drive circuit is mounted on the TFT substrate using chip on film (COF), chip on glass (COG), or the like. The GDM technique is sometimes referred to as gate driver on array (GOA).

WO 2011/067963 and WO 2014/115810 disclose liquid crystal display devices to which the GDM technique is applied. For example, in the liquid crystal display device disclosed in WO 2011/067963, gate drivers provided on the left and/or the right side of the display region, trunk wiring lines extending in the vertical direction for supplying signals to the gate drivers, and branch wiring lines extending in the horizontal direction and connected to the trunk wiring lines and circuits constituting the gate drivers are provided in the region other than the display region (also referred to as a "peripheral region" or a "frame region"). The trunk wiring lines and the branch wiring lines are formed in conductive layers different from each other, and are electrically connected to each other via contact holes formed in an insulating layer between the trunk wiring lines and the branch wiring lines.

SUMMARY

Improvement of the manufacturing yield of display devices to which the GDM technique is applied has been demanded. In a display device to which the GDM technique is applied, when electro-static discharge (ESD) occurs in a peripheral region, a circuit constituting the gate driver may be damaged via the branch wiring line, and the manufacturing yield may be reduced.

An object of the disclosure is to provide a display device that minimizes the occurrence of defects caused by ESD.

According to embodiments of the disclosure, solutions described in the following items are provided.

Item 1

A display device including a plurality of pixels arrayed in a matrix shape with a plurality of pixel rows and a plurality of pixel columns, the display device including a display region defined by the plurality of pixels, and a peripheral region other than the display region; a gate drive circuit provided in the peripheral region and including a shift register including a plurality of stages corresponding to the plurality of pixel rows, respectively; a first trunk line that is provided in the peripheral region, extends in a column direction, and supplies a first signal to any one or more of the plurality of stages of the shift register; one or more first branch wiring lines provided in the peripheral region and electrically connected to the first trunk line; one or more first contact holes through which a first portion of the first trunk line and a first portion of a corresponding first branch wiring line of the one or more first branch wiring lines are exposed; and one or more third contact holes through which a third portion of a conductive portion included in a first conductive layer is exposed, in which the first trunk line is included in the first conductive layer, the one or more first branch wiring lines are included in a second conductive layer, in each of the one or more first contact holes, the first portion of the first trunk line and the first portion of a corresponding first branch wiring line of the one or more first branch wiring lines are electrically connected to each other, a range of the third portion in a row direction overlaps a range of the first trunk line in the row direction, and a range of the third portion in the column direction overlaps a range of the first trunk line in the column direction, and an electric resistance value between the third portion and a first branch wiring line of the one or more first branch wiring lines is higher than an electric resistance value between the first portion of the first trunk line and the first branch wiring line connected to the first portion of the first trunk line.

Item 2

The display device described in Item 1 further including a second trunk line that is provided in the peripheral region, extends in the column direction, and supplies the first signal to any one or more of the plurality of stages of the shift register; another trunk line that is provided in the peripheral region, extends in the column direction, and supplies a second signal to any one or more of the plurality of stages of the shift register; one or more second branch wiring lines provided in the peripheral region and electrically connected to the other trunk line; and one or more second contact holes through which a second portion of the other trunk line and a second portion of a corresponding second branch wiring line of the one or more second branch wiring lines are exposed, in which the one or more first branch wiring lines electrically connect the first trunk line and the second trunk line, the first trunk line is disposed farther from the display region than each of the second trunk line and the other trunk line is from the display region, the second trunk line and the other trunk line are included in the first conductive layer, the one or more second branch wiring lines are included in the second conductive layer, and the second portion of the other trunk line is electrically connected to the second portion of a corresponding second branch wiring line of the one or more second branch wiring lines in each of the one or more second contact holes.

Item 3

The display device described in Item 1 or 2, in which the one or more first branch wiring lines are a plurality of first branch wiring lines, the one or more first contact holes are a plurality of first contact holes formed corresponding to the plurality of first branch wiring lines, respectively, the one or more third contact holes are a plurality of third contact holes, and the number of the plurality of third contact holes is greater than the number of the plurality of first contact holes.

Item 4

In the display device described in Item 3, when an arrangement position of each of the plurality of first contact holes in the column direction is set as a first position and an arrangement position of each of the plurality of third contact holes in the column direction is set as a third position, the plurality of first contact holes and the plurality of third contact holes are formed in a manner that a plurality of the third positions is present, in the column direction, between two of the first positions adjacent to each other.

Item 5

The display device described in any one of Items 1 to 4 further including one or more first conductive portions provided corresponding to the one or more first contact holes, each of the one or more first conductive portions being electrically connected to the first portion of the first trunk line and the first portion of a corresponding first branch wiring line of the one or more first branch wiring lines; and one or more third conductive portions provided corresponding to the one or more third contact holes, each of the one or more third conductive portions being electrically connected to the third portion, in which the one or more first conductive portions and the one or more third conductive portions are included in a third conductive layer.

Item 6

The display device described in Item 2 further including one or more first conductive portions provided corresponding to the one or more first contact holes, each of the one or more first conductive portions being electrically connected to the first portion of the first trunk line and the first portion of a corresponding first branch wiring line of the one or more first branch wiring lines; one or more second conductive portions provided corresponding to the one or more second contact holes, each of the one or more second conductive portions being electrically connected to the second portion of the other trunk line and the second portion of a corresponding second branch wiring line of the one or more second branch wiring lines; and one or more third conductive portions provided corresponding to the one or more third contact holes, each of the one or more third conductive portions being electrically connected to the third portion, in which the one or more first conductive portions, the one or more second conductive portions, and the one or more third conductive portions are included in a third conductive layer.

Item 7

In the display device described in Item 5, the one or more first conductive portions and the one or more third conductive portions are formed of a transparent conductive material.

Item 8

In the display device described in any one of Items 5 to 7, a gate electrode of a TFT included in each of the plurality of pixels is included in the first conductive layer, a source electrode of the TFT included in each of the plurality of pixels is included in the second conductive layer, and a pixel electrode included in each of the plurality of pixels is included in the third conductive layer.

Item 9

The display device described in any one of Items 5 to 8 further including a first substrate and a second substrate arranged facing each other; a liquid crystal layer provided between the first substrate and the second substrate; and a sealing portion surrounding the liquid crystal layer, in which the one or more first conductive portions and the one or more third conductive portions do not overlap the sealing portion in a plan view.

Item 10

In the display device described in Item 9, the first substrate includes the first conductive layer, the second conductive layer, and the third conductive layer; and the second substrate includes one or more projecting structures provided facing a corresponding third contact hole of the one or more third contact holes, the one or more projecting structures projecting toward the first substrate.

Item 11

In the display device described in any one of Items 1 to 10, an arrangement position of each of the one or more third contact holes in the row direction is farther from the display region than an arrangement position of each of the one or more first contact holes in the row direction is from the display region.

Item 12

In the display device described in any one of Items 1 to 11, the third portion is a part of the first trunk line, and in each of the one or more third contact holes, the third portion is not connected to any conductive portion included in the second conductive layer.

Item 13

In the display device described in any one of Items 5 to 10, the third portion is a part of the first trunk line, the one or more third conductive portions are a plurality of third conductive portions, and the display device further includes a connecting portion included in the second conductive layer and electrically connecting two or more third conductive portions among the plurality of third conductive portions.

Item 14

In the display device described in Item 13, the connecting portion overlaps the first trunk line in a plan view.

Item 15

In the display device described in Item 13 or 14, the connecting portion electrically connects the two or more third conductive portions to any one of the one or more first conductive portions.

Item 16

In the display device described in any one of Items 1 to 11, the first trunk line includes one or more notched portions, the display device further includes one or more island-shaped conductive portions included in the first conductive layer and disposed, separated from the first trunk line, in a corresponding notched portion of the one or more notched portions, and the third portion is a part of the one or more island-shaped conductive portions.

Item 17

In the display device described in Item 16, in each of the one or more third contact holes, the third portion is not connected to any conductive portion included in the second conductive layer.

Item 18

In the display device described in any one of Items 5 to 10, the first trunk line includes one or more notched portions, the display device further includes one or more island-shaped conductive portions included in the first conductive layer and disposed, separated from the first trunk line, in a corresponding notched portion of the one or more notched portions, the third portion is a part of the one or more island-shaped conductive portions, the one or more third conductive portions are a plurality of third conductive portions, and the display device further includes a first connecting portion included in the second conductive layer and electrically connecting two or more third conductive portions among the plurality of third conductive portions.

Item 19

In the display device described in Item 18, the first connecting portion at least partially overlaps the one or more island-shaped conductive portions and at least partially overlaps the first trunk line, in a plan view.

Item 20

In the display device described in Item 18 or 19, the one or more notched portions are a plurality of notched portions, the one or more island-shaped conductive portions are a plurality of island-shaped conductive portions disposed in the plurality of notched portions, respectively, and the first connecting portion electrically connects two or more third conductive portions electrically connected to different island-shaped conductive portions of the plurality of island-shaped conductive portions, among the plurality of third conductive portions.

Item 21

The display device described in Item 16 or 17 further includes a second connecting portion formed of a transparent conductive material and electrically connecting the one or more island-shaped conductive portions and the first trunk line.

Item 22

The display device described in Item 16 or 17 further includes an ESD protection circuit electrically connected to the one or more island-shaped conductive portions and the first trunk line.

According to an embodiment of the disclosure, a display device that minimizes the occurrence of defects caused by ESD is provided.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that, although a liquid crystal display panel and a liquid crystal display device will be introduced below as an example of a display panel and a display device according to embodiments of the disclosure, the disclosure is not limited to the following embodiments. In the following drawings, constituent elements having substantially the same functions may be denoted by common reference signs, and description thereof may be omitted.

First Embodiment

Figure 1:
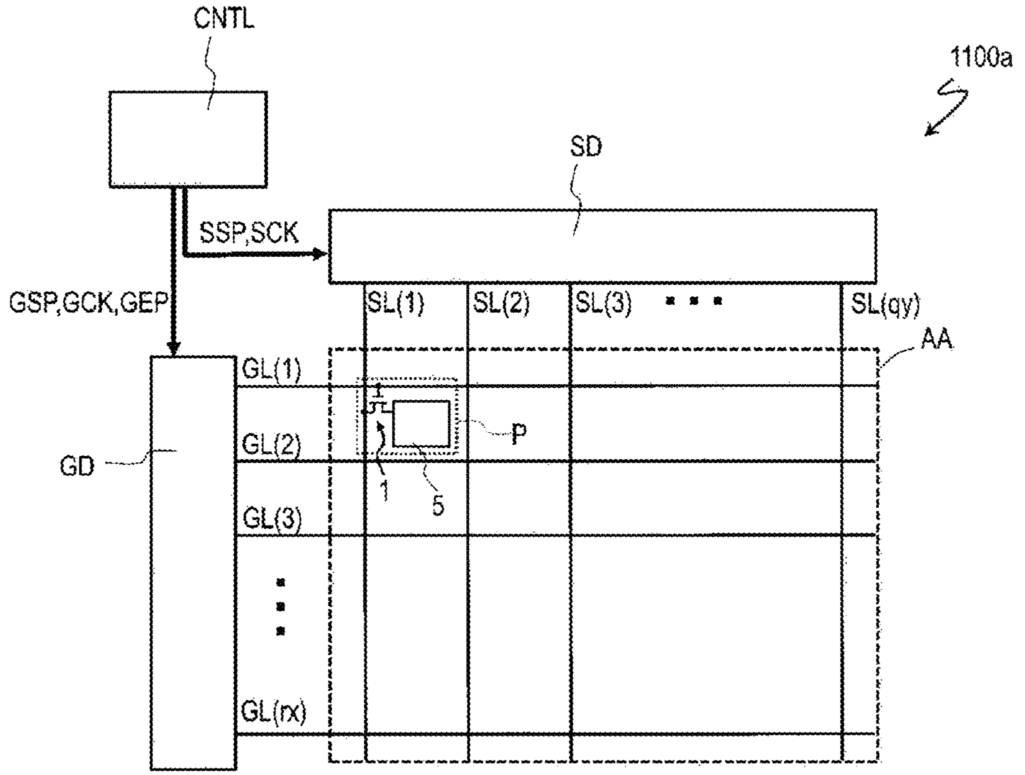
FIG. 1 is a schematic view illustrating a configuration of a display device 1100*a* according to a first embodiment of the disclosure.
Figure 2:
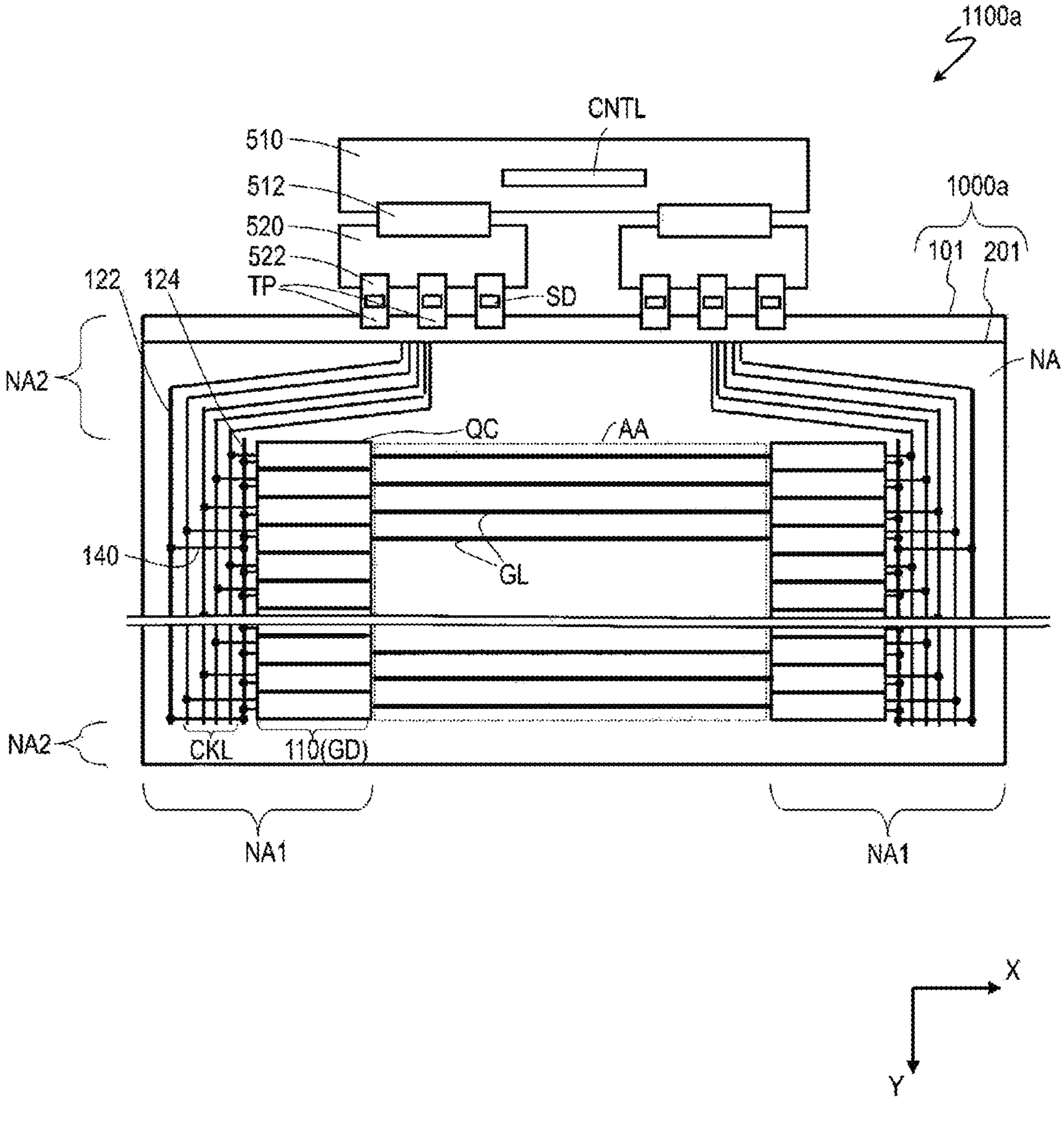
FIG. 2 is a schematic plan view of the display device 1100*a*.

A liquid crystal display panel 1000*a* and a liquid crystal display device 1100*a* including the liquid crystal display panel 1000*a* (hereinafter also referred to as a "display panel 1000*a*" and a "display device 1100*a*") according to the present embodiment will be described with reference to FIGS. 1 and 2. FIG. 1 is a schematic view illustrating a configuration of the display device 1100*a*. FIG. 2 is a schematic plan view of the display device 1100*a*.

As illustrated in FIGS. 1 and 2, the display panel 1000*a* includes a plurality of pixels P arrayed in a matrix shape including a plurality of pixel rows and a plurality of pixel columns. Each pixel P is provided with a thin film transistor (TFT) 1 and a pixel electrode 5 electrically connected to the TFT 1. The pixel row is a plurality of the pixels P arrayed in a row direction (X direction in FIG. 2), and the pixel column is a plurality of the pixels P arrayed in a column direction (Y direction in FIG. 2).

The display panel 1000*a* includes a display region AA defined by the plurality of pixels P, and a peripheral region NA other than the display region AA. The peripheral region NA includes a first peripheral region NA1 outside the display region AA in the row direction, and a second peripheral region NA2 outside the display region AA in the column direction. The first peripheral region NA1 and the second peripheral region NA2 may overlap each other.

The display panel 1000*a* includes a TFT substrate 101 (which may be referred to as a "first substrate") and a counter substrate 201 (which may be referred to as a "second substrate") facing each other, and a liquid crystal layer LC (e.g., see FIG. 4B described below) provided between these substrates, and a sealing portion 40 (e.g., see FIG. 4B) surrounding the liquid crystal layer LC.

In this example, a gate bus line GL is associated with each of the plurality of pixel rows, and a source bus line SL is associated with each of the plurality of pixel columns. The TFT 1 of each pixel P is supplied with a gate signal from the corresponding gate bus line GL, and is supplied with a source signal from the corresponding source bus line SL. The pixel rows may be referred to as a first row, a second row, and an rx-th row in order from the top, and the gate bus line associated with the r-th pixel row (1≤r≤rx) may be referred to as a gate bus line GL (r) (see FIG. 1). Here, rx is the number of pixel rows included in the display panel 1000*a*. The pixel in the r-th pixel row is selected by the scanning signal voltage supplied to the gate bus line GL (r). The gate bus line GL (r) associated with the r-th pixel row is connected to a gate electrode of the TFTs connected to the pixels included in the r-th pixel row. The pixel columns may be referred to as a first column, a second column, . . . , and a qy-th column in order from the left, and the source bus line SL associated with the q-th pixel column may be referred to as a source bus line SL (q). Here, qy is the number of pixel columns included in the display panel 1000*a*. A display signal voltage is supplied from the source bus line SL (q) to the pixels in the q-th pixel column (1≤q≤qy). The source bus line SL (q) associated with the q-th pixel column is connected to a source electrode of the TFTs connected to the pixels included in the q-th pixel column.

The display panel 1000*a* includes a gate drive circuit GD. Herein, the gate drive circuit GD is integrally formed on the TFT substrate 101 (gate driver monolithic). The gate drive circuit GD is provided in the first peripheral region NA1 of the display panel 1000*a* and includes a shift register 110 having a plurality of stages corresponding to the plurality of pixel rows, respectively. Outputs of each stage of the shift register 110 are connected to the gate bus lines GL respectively associated with the plurality of pixel rows. Typically, the shift register 110 includes rx stages and, given that the first stage, the second stage, . . . , and the rx-th stage are arranged in this order from the top, the output of the r-th stage (1≤r≤rx) is connected to the gate bus line GL (r). In addition to the rx stages, the shift register 110 may further include one or more dummy stages adjacent to the rx stages in the column direction and not contributing to display. The shift register 110 is configured by cascade-connecting a plurality of unit circuits QC. Each stage of the shift register 110 is configured by each unit circuit QC. The unit circuit QC constituting each stage of the shift register 110 includes at least one TFT (semiconductor element).

The display device 1100*a* includes the display panel 1000*a* and a circuit substrate 510 connected to the display panel 1000*a* as illustrated in FIG. 2. The circuit substrate 510 includes a control circuit CNTL that supplies a control signal to the gate drive circuit GD. For example, the control circuit CNTL is mounted on the circuit substrate 510. The circuit substrate 510 is connected to terminal portions TP formed in the second peripheral region NA2 of the display panel 1000*a* via a source substrate 520. The circuit substrate 510 is connected to the source substrate 520 via flexible printed circuits (FPCs) 512. The terminal portions TP are provided with terminals electrically connected to each trunk line for supplying a signal to the gate drive circuit GD. The circuit substrate 510 supplies, via the source substrate 520, a signal from the terminal portions TP of the display panel 1000*a* to each trunk line for supplying a signal to the gate drive circuit GD. In this example, the circuit substrate 510 is connected to the display panel 1000*a* via a plurality of the source substrates 520. Each of the source substrates 520 (printed wiring boards) is connected to the display panel 1000*a* via a plurality of the flexible printed circuits 522, and source drive circuits SD for supplying a display signal voltage to the source bus lines SL are mounted on the flexible printed circuits 522. Note that, in FIG. 2, the source bus lines SL are not illustrated for ease of understanding. The control circuit CNTL also supplies control signals to the source drive circuits SD, for example.

The control signals supplied from the control circuit CNTL to the gate drive circuit GD include, for example, a gate start pulse signal GSP, a gate clock signal GCK, and a gate end pulse signal GEP. The terminal portions TP in the second peripheral region NA2 of the display panel **1000*a* are provided with terminals (n clock trunk line terminals and an outer trunk line terminal) electrically connected to the n clock trunk lines CKL1 to CKLn and an outer trunk line 122 (which may be referred to as a "first trunk line"), respectively. The control signals supplied from the control circuit CNTL to the source drive circuits SD include, for example, a source start pulse signal SSP and a source clock signal SCK. Note that the arrangement and connection method of the source drive circuits SD and the control circuit CNTL are not limited to those illustrated in the drawing. Further, although the gate drive circuit GD and the wiring lines for supplying signals to the gate drive circuit GD are provided on both the left and right sides of the display region AA in FIG. 2**, the gate drive circuit GD and the wiring lines for supplying signals to the gate drive circuit GD may be provided on only one of the left and right sides of the display region AA.

Figure 3:
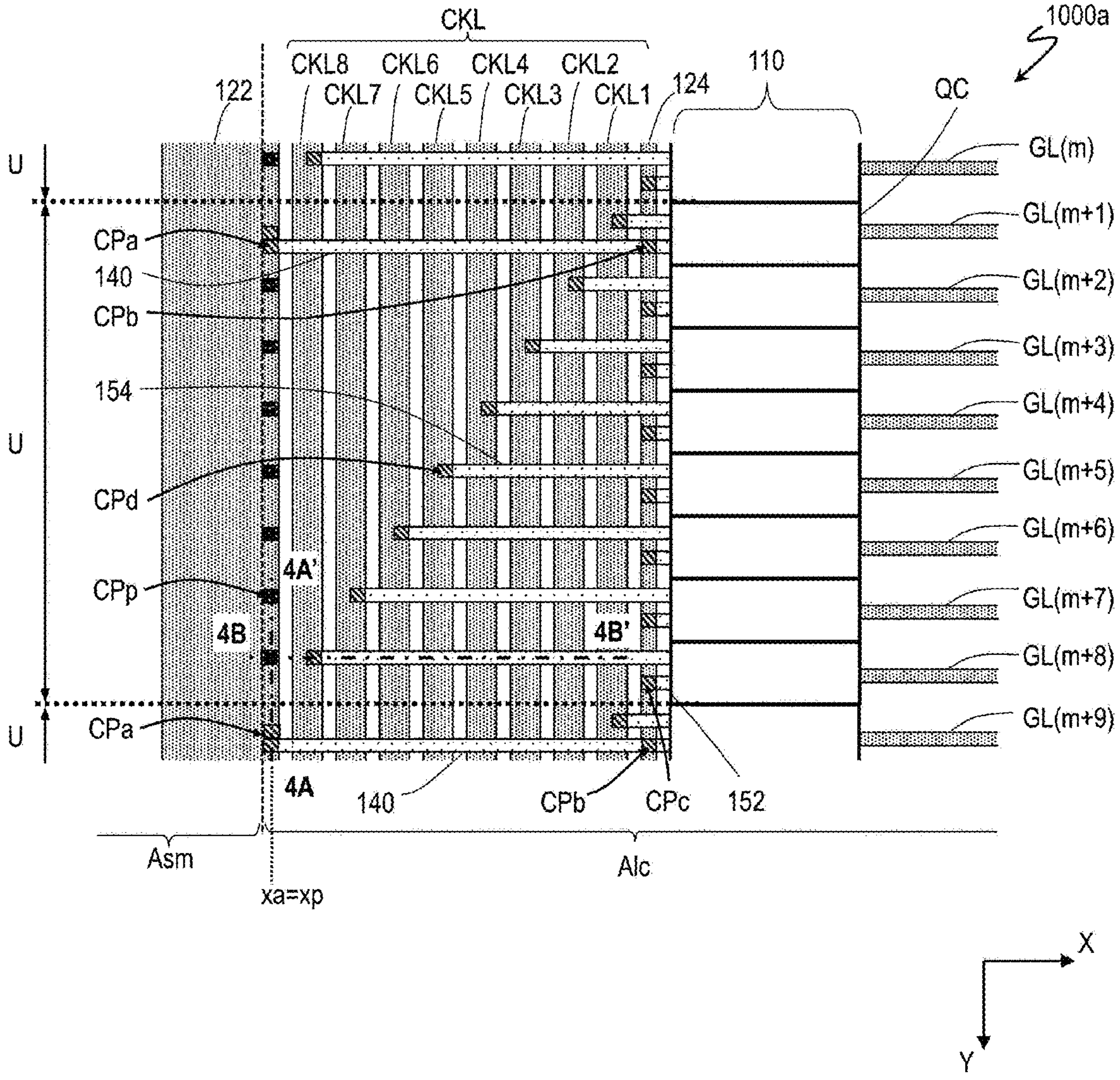
FIG. 3 is a schematic plan view of a display panel 1000*a* of the display device 1100*a* and plan view illustrating a portion of a peripheral region NA.
Figure 4A:
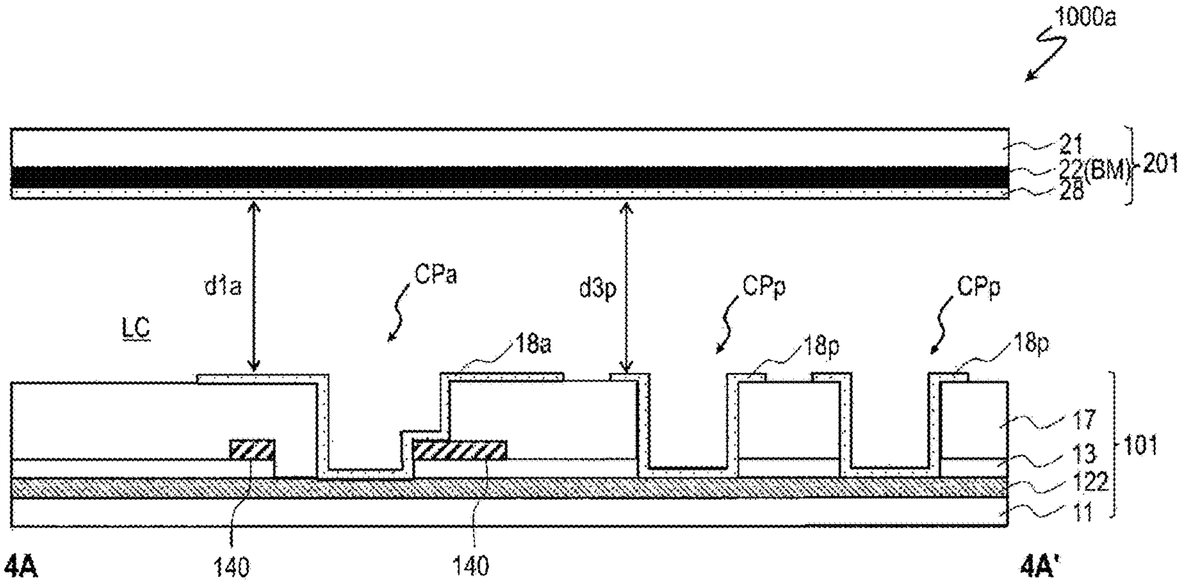
FIG. 4A is a schematic cross-sectional view of the display panel 1000*a* and cross-sectional view taken along the line 4A-4A' in FIG. 3.
Figure 4B:
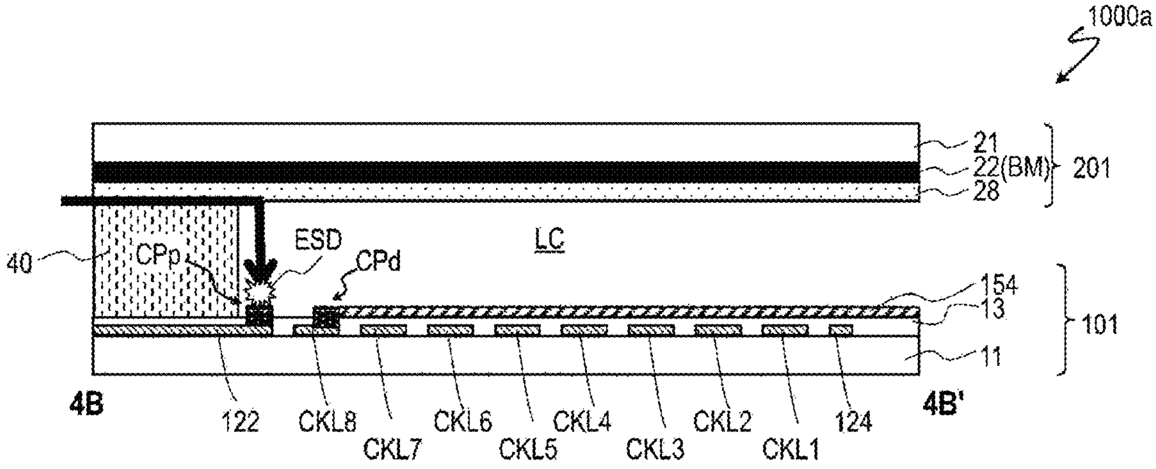
FIG. 4B is a schematic cross-sectional view of the display panel 1000*a* and cross-sectional view taken along the line 4B-4B' in FIG. 3.

A structure of the display panel **1000*a* will be described in detail further with reference to FIGS. 3, 4A, and 4B. FIG. 3 is a schematic plan view of the display panel 1000*a* and view illustrating an enlargement of a portion of the peripheral region NA of the display panel 1000*a*. FIG. 3 illustrates a region including the gate bus lines GL(m) to GL(m+9) (1≤m≤rx−9). FIGS. 4A and 4B are cross-sectional views schematically illustrating the display panel 1000*a*, FIG. 4A is a cross-sectional view taken along the line 4A-4A' in FIG. 3, and FIG. 4B is a cross-sectional view taken along the line 4B-4B' in FIG. 3**.

The display panel **1000*a* further includes wiring line groups for supplying signals to the gate drive circuit GD as illustrated in FIG. 3. These wiring line groups are provided on the TFT substrate 101 included in the display panel 1000*a*. To be more specific, the display panel 1000*a* includes, in a peripheral region NA (more specifically, in the first peripheral region NA1), an outer trunk line 122, one or more first branch wiring lines 140 electrically connected to the outer trunk line 122, one or more first contact portions CPa provided corresponding to the wiring line groups, and one or more third contact portions CPp. The display panel 1000*a* further includes, in the peripheral region NA (more specifically, in the first peripheral region NA1), an inner trunk line 124 (also referred to as a "second trunk line"), clock trunk lines CKL (also referred to as "other trunk lines"), one or more second branch wiring lines 154 electrically connected to the clock trunk lines CKL, and one or more second contact portions CPd. Each of the first contact portions CPa, the second contact portions CPd, and the third contact portions CPp has a first contact hole CHa, a second contact hole CHd, and a third contact hole CHp, respectively, as will be described below with reference to FIGS. 5A and 5B, FIGS. 6A and 6B, and FIG. 7**.

As illustrated in FIG. 3, the outer trunk line 122, the inner trunk line 124, and the clock trunk lines CKL are wiring lines extending in the column direction. The outer trunk line 122 is disposed farther from the display region AA than each of the inner trunk line 124 and the clock trunk lines CKL is from the display region. The clock trunk lines CKL are provided between the outer trunk line 122 and the inner trunk line 124. The inner trunk line 124 is disposed farther from the display region AA than the shift register 110 is from the display region. The first branch wiring lines 140 and the second branch wiring lines 154 are wiring lines extending in the row direction.

Each of the outer trunk line 122 and the inner trunk line 124 supplies a first signal to one or more of the plurality of stages of the shift register 110. The first signal is, for example, a signal applying a low-level potential Vgl of a gate clock signal to be described below. The first signal may be a signal commonly supplied to a plurality of stages of the shift register 110. A first signal for applying a fixed potential (e.g., a signal for applying the low-level potential Vgl) is supplied from the control circuit CNTL to the outer trunk line 122 connected via an outer trunk line terminal. As will be described below, the outer trunk line 122 and the inner trunk line 124 are electrically connected via the first branch wiring lines 140, and the inner trunk line 124 and the input (input terminal) of each stage of the shift register 110 are electrically connected via the third branch wiring lines 152 extending in the row direction, and thus the first signal is supplied to the input of each stage of the shift register 110. Note that the first signal is not limited to a signal for applying the low-level potential Vgl, and may be, for example, a signal for applying a high-level potential Vgh of the gate clock signal or a signal for applying another potential (e.g., a fixed potential).

The first branch wiring lines 140 electrically connect the outer trunk line 122 and the inner trunk line 124. The first branch wiring lines 140 and the outer trunk line 122 are electrically connected to each other at the first contact portions CPa. In the illustrated example, the display panel **1000*a* includes a plurality of first branch wiring lines 140. In the example illustrated in FIG. 3, each of the plurality of first branch wiring lines 140 is provided corresponding to n second branch wiring lines 154 electrically connected to n clock trunk lines CKL1 to CKLn. As illustrated in FIG. 3, the first peripheral region NA1 includes a plurality of unit regions U arrayed in the column direction, and each unit region U corresponds to n stages of the shift register 110 to which n types of clock signals having different phases are supplied from n clock trunk lines CKL1 to CKLn. The plurality of first branch wiring lines 140** are provided for unit regions U, respectively.

As illustrated in FIG. 3, the display panel **1000*a* includes n clock trunk lines CKL1 to CKLn as the clock trunk lines CKL. The n clock trunk lines CKL1 to CKLn may be collectively referred to as clock trunk lines CKL. The n clock trunk lines CKL1 to CKLn supply n types (n is an integer of 2 or more) of clock signals having different phases to the plurality of stages of the shift register 110. Each of the n clock trunk lines CKL1 to CKLn supplies a clock signal (which may be referred to as a "second signal") to any one or more of the plurality of stages of the shift register 110. Each of the clock trunk lines CKL and the input (input terminal) at each stage of the shift register 110 are electrically connected to each other via the second branch wiring lines 154 extending in the row direction. Each of the clock trunk lines CKL and the second branch wiring lines 154 are electrically connected to each other at the second contact portions CPd. In the example illustrated in FIG. 3, the display panel 1000*a* includes a plurality of second branch wiring lines 154. Each of the plurality of second branch wiring lines 154 may be provided corresponding to any one of the clock trunk lines CKL. Note that the second branch wiring lines 154 may be electrically connected to each of the clock trunk lines CKL and another trunk line connected to the input (input terminal) of each stage of the shift register 110**.

In the example of FIG. 3, eight clock trunk lines CKL1 to CKL8 are provided as the n clock trunk lines CKL1 to CKLn (n=8). Given that the gate clock signals GCK supplied from the clock trunk lines CKL1 to CKL8 are GCK1 to GCK8, the gate clock signals GCK1 to GCK8 are, for example, oscillating voltages having a cycle of 8 H (1 H is one horizontal scanning period) and a duty ratio of 1:1 (of the 8 Hs of one cycle, 4 Hs are at high level, and 4 Hs are at low level), and the phases differ for each 1 H. For example, a low-level potential Vgl is −7 V and a high-level potential Vgh is 35 V. The terminal portions TP in the second peripheral region NA2 of the display panel 1000*a* are provided with terminals (eight clock trunk line terminals) electrically connected to the clock trunk lines CKL1 to CKL8, respectively, and the control circuit CNTL supplies the gate clock signals GCK1 to GCK8 to the clock trunk lines CKL1 to CKL8, respectively, connected via the clock trunk line terminals. The clock trunk lines CKL1 to CKL8 and the inputs (input terminals) of the stages of the shift register 110 are electrically connected to each other via the second branch wiring lines 154 extending in the row direction, and thus the gate clock signals GCK1 to GCK8 are supplied to the inputs of the stages of the shift register 110. An example of a connection relationship between the input of each stage of the shift register 110 and the n clock trunk lines CKL1 to CKLn is as follows. For example, the inputs of the first to eighth stages are supplied with the gate clock signals GCK1 to GCK8 from the clock trunk lines CKL1 to CKL8, respectively, the inputs of the ninth to 16th stages are supplied with the gate clock signals GCK1 to GCK8 from the clock trunk lines CKL1 to CKL8, respectively, the inputs of the 17th to 24th stages are supplied with the gate clock signals GCK1 to GCK8 from the clock trunk lines CKL1 to CKL8, respectively, and so on. That is, the input of the {(a×n)+k}-th stage of the shift register 110 receives supply of a gate clock signal GCKk from a clock trunk line CKLk (here, a is an integer of 0 or greater, and k is an integer from 1 to n).

Figure 5A:
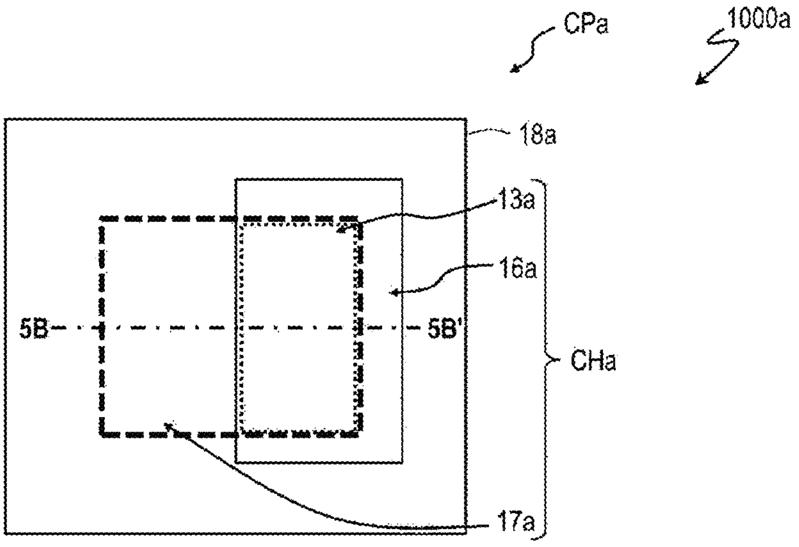
FIG. 5A is a schematic plan view of a first contact portion CPa of the display panel 1000*a*.
Figure 5B:
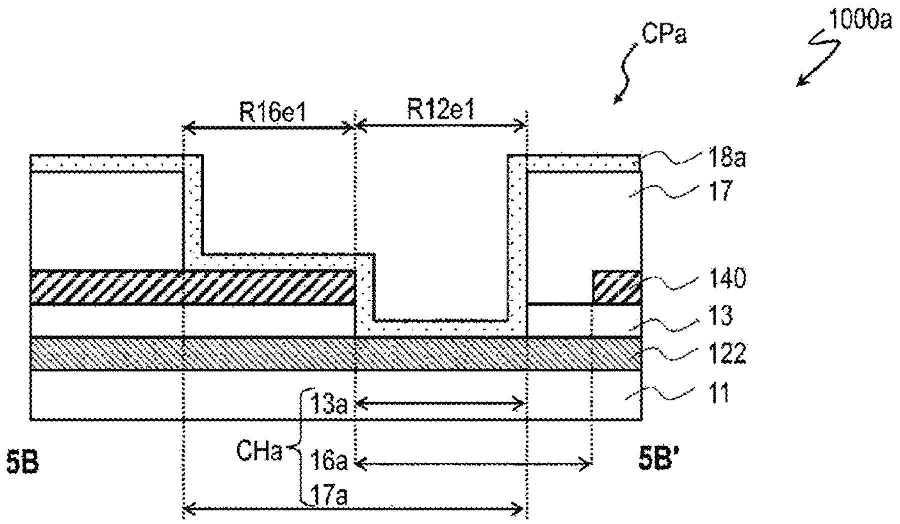
FIG. 5B is a schematic cross-sectional view of the first contact portion CPa of the display panel 1000*a* and cross-sectional view taken along the line 5B-5B' in FIG. 5A.

An example of a structure of a first contact portion CPa will be described also with reference to FIGS. 5A and 5B. FIG. 5A is a schematic plan view of the first contact portion CPa. FIG. 5B is a schematic cross-sectional view of the first contact portion CPa and cross-sectional view taken along the line 5B-5B' in FIG. 5A.

As described above, a first branch wiring line 140 and an outer trunk line 122 are electrically connected to each other at each first contact portion CPa. The first contact portion CPa has a first contact hole CHa through which a portion of the outer trunk line 122 (a first portion R12*e*1 in the illustrated example) and a portion of the first branch wiring line 140 (a first portion R16*e*1 in the illustrated example) are exposed. In the first contact hole CHa, the first portion R12*e*1 of the outer trunk line 122 and the first portion R16*e*1 of the first branch wiring line 140 are electrically connected to each other. In this example, the first contact portion CPa further includes a first conductive portion 18*a* formed corresponding to the first contact hole CHa. The first conductive portion 18*a* includes a portion formed within the first contact hole CHa. The first conductive portion 18*a* is electrically connected to the first portion R12*e*1 of the outer trunk line 122 and the first portion R16*e*1 of the first branch wiring line 140 which are exposed in the first contact hole CHa.

The outer trunk line 122 and the inner trunk line 124 are included in a first conductive layer included in the TFT substrate 101. The first conductive layer includes, for example, the gate electrode of the TFT 1 included in each pixel P. That is, the first conductive layer is, for example, a gate metal layer. The gate electrode of the TFT 1 is formed in the same layer as the gate bus lines GL. That is, the gate electrode is formed of the same conductive film (gate metal film) as the gate bus lines GL. In the present specification, electrodes and wiring lines formed of a gate metal film are collectively referred to as a “gate metal layer”. That is, the gate metal layer includes the plurality of gate bus lines GL and the gate electrodes included in the TFTs 1 of a plurality of pixels P. Note that the constituent elements included in the TFT substrate 101 are supported by the substrate 11 (e.g., a glass substrate).

The first branch wiring lines 140 are included in the second conductive layer included in the TFT substrate 101. The second conductive layer includes, for example, the source electrode of the TFT 1 included in each pixel P. That is, the second conductive layer is, for example, a source metal layer. The source electrode and the drain electrode of the TFT 1 are formed in the same layer as the source bus line SL. That is the source electrode and the drain electrode are formed of the same conductive film (source metal film) as the source bus line SL. In the present specification, electrodes and wiring lines formed of the source metal film are collectively referred to as a “source metal layer”. That is, the source metal layer includes a plurality of source bus lines SL and the source electrodes and the drain electrodes included in the TFTs 1 of a plurality of pixels P.

The first contact hole CHa includes a first opening 13*a* formed in a gate insulating layer 13 between the gate metal layer and the source metal layer and a first opening 17*a* formed in the interlayer insulating layer 17 on the source metal layer. Although the first contact hole CHa further includes an opening 16*a* formed in the first branch wiring line 140 in the illustrated example, the disclosure is not limited to this example, and the first contact hole may be formed such that a portion of the outer trunk line 122 and a portion of the first branch wiring line 140 are exposed. In this example, the source metal layer is formed on the gate metal layer via the gate insulating layer 13. The arrangement relationship between the gate metal layer and the source metal layer may be reversed.

The first conductive portion 18*a* is included in a third conductive layer included in the TFT substrate 101. The third conductive layer includes, for example, pixel electrodes 5 included in the plurality of pixels P. The first conductive portion 18*a* is formed of a transparent conductive material such as ITO, for example. The third conductive layer is formed on the interlayer insulating layer 17 in this example.

The display panel 1000*a* may include a plurality of first contact portions CPa. Each of the plurality of first contact portions CPa is formed corresponding to, for example, one of the plurality of first branch wiring lines 140. In a certain first contact portion CPa, the first branch wiring line 140 electrically connected to the outer trunk line 122 may be referred to as the first branch wiring line 140 corresponding to the first contact portion CPa. Since the first branch wiring line 140 is provided for each unit region U in the example illustrated in FIG. 3, the first contact portion CPa is also provided for each unit region U.

The display panel 1000*a* further includes fourth contact portions CPc and fifth contact portions CPb. The fourth contact portions CPc and the fifth contact portions CPb may have the same structure as that of the first contact portion CPa illustrated in FIGS. 5A and 5B. The first branch wiring lines 140 and the inner trunk line 124 are electrically connected to each other at the fifth contact portions CPb. The inner trunk line 124 and the third branch wiring lines 152 are electrically connected to each other at the fourth contact portions CPc.

Figure 6A:
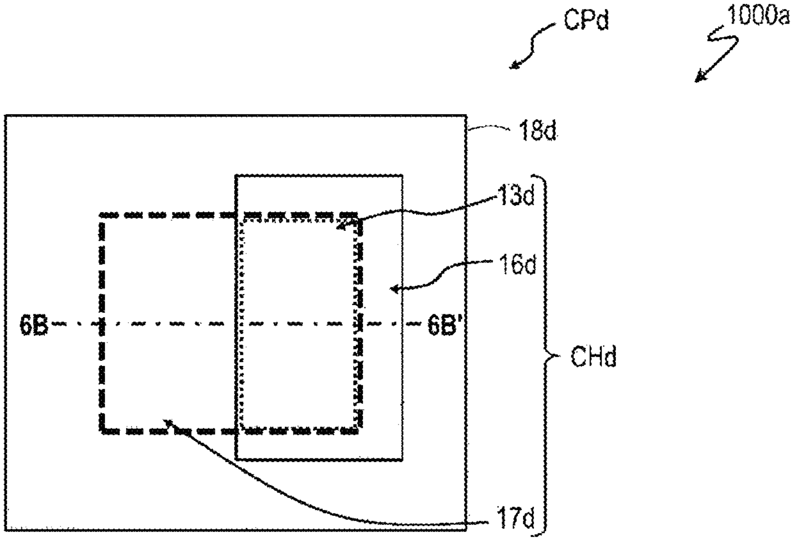
FIG. 6A is a schematic plan view of a second contact portion CPd of the display panel 1000*a*.
Figure 6B:
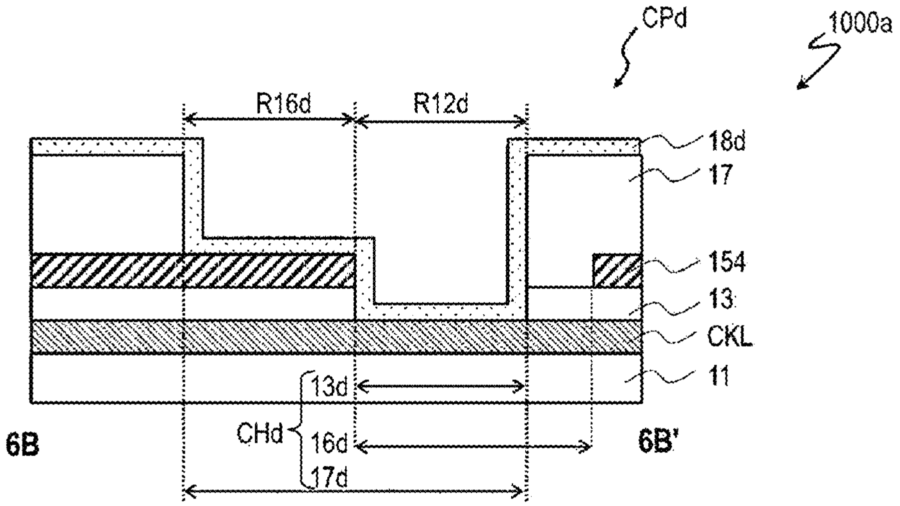
FIG. 6B is a schematic cross-sectional view of the second contact portion CPd of the display panel 1000*a* and cross-sectional view taken along the line 6B-6B' in FIG. 6A.

An example of a structure of a second contact portion CPd will be described also with reference to FIGS. 6A and 6B. FIG. 6A is a schematic plan view of the second contact portion CPd. FIG. 6B is a schematic cross-sectional view of the second contact portion CPd and cross-sectional view taken along the line 6B-6B' in FIG. 6A.

As described above, the clock trunk lines CKL and the second branch wiring lines 154 are electrically connected to each other at the second contact portions CPd.

The clock trunk lines CKL are included in the first conductive layer, and the second branch wiring lines 154 are included in the second conductive layer. In this example, the clock trunk lines CKL are included in the gate metal layer, and the second branch wiring lines 154 are included in the source metal layer.

Each second contact portion CPd has a second contact hole CHd through which a portion of the clock trunk line CKL (a second portion R12*d* in the illustrated example) and a portion of the second branch wiring line 154 (a second portion R16*d* in the illustrated example) are exposed. In the second contact hole CHd, the second portion R12*d* of the clock trunk line CKL and the second portion R16*d* of the second branch wiring line 154 are electrically connected to each other. In this example, the second contact portion CPd further includes a second conductive portion 18*d* formed corresponding to the second contact hole CHd. The second conductive portion 18*d* includes a portion formed within the second contact hole CHd. The second conductive portion 18*d* is electrically connected to the second portion R12*d* of the clock trunk line CKL and the second portion R16*d* of the second branch wiring line 154 which are exposed in the second contact hole CHd.

The second contact hole CHd includes a second opening 13*d* formed in the gate insulating layer 13 between the gate metal layer and the source metal layer and a second opening 17*d* formed in the interlayer insulating layer 17 on the source metal layer. Although the second contact hole CHd further includes an opening 16*d* formed in the second branch wiring line 154 in the illustrated example, the disclosure is not limited to this example, and the second contact hole may be formed such that a portion of the clock trunk line CKL and a portion of the second branch wiring line 154 are exposed.

The second conductive portion 18*d* is included in the third conductive layer. In this example, the second conductive portion 18*d* is included in the same conductive layer as the pixel electrodes 5 included in the plurality of pixels P. The second conductive portion 18*d* can be formed of, for example, a transparent conductive material such as ITO, similarly to the first conductive portion 18*a*.

The display panel 1000*a* may include a plurality of second contact portions CPd. Each of the plurality of second contact portions CPd is formed corresponding to, for example, one of the plurality of second branch wiring lines 154. In a certain second contact portion CPd, the second branch wiring line 154 electrically connected to the clock trunk line CKL may be referred to as the second branch wiring line 154 corresponding to the second contact portion CPd. Since each of the plurality of second branch wiring lines 154 is provided corresponding to any one of the clock trunk lines CKL in the example illustrated in FIG. 3, the second contact portion CPd is also provided corresponding to each clock trunk line CKL. In the example illustrated in FIG. 3, the number of second contact portions CPd (i.e., the number of second contact holes CHd) is greater than the number of first contact portions CPa (i.e., the number of first contact holes CHa).

Figure 7:
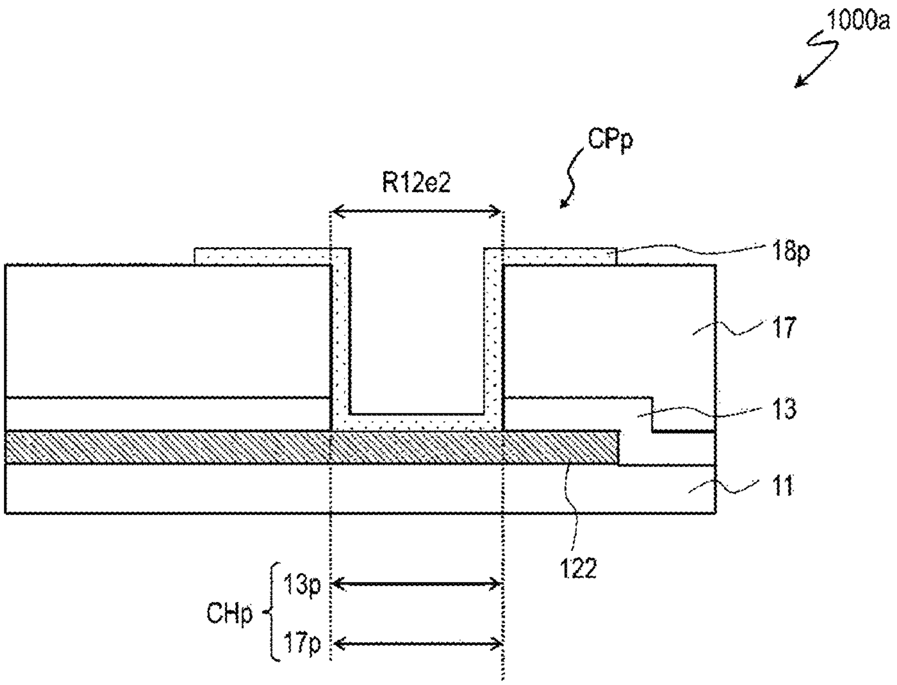
FIG. 7 is a schematic cross-sectional view of a third contact portion CPp of the display panel 1000*a*.

An example of a structure of the third contact portion CPp will be described also with reference to FIG. 7. FIG. 7 is a schematic cross-sectional view of the third contact portion CPp. The display panel 1000*a* may include a plurality of third contact portions CPp.

Each third contact portion CPp has a third contact hole CHp through which another portion of the outer trunk line 122 (a third portion R12*e*2 in the illustrated example) is exposed. The portion of the outer trunk line 122 exposed in the third contact hole CHp does not overlap with the portion exposed in the first contact hole CHa. In this example, the third portion R12*e*2 of the outer trunk line 122 does not overlap the first portion R12*e*1 in a plan view (i.e., when viewed from the normal direction of the TFT substrate 101). In this example, the third contact portion CPp further includes a third conductive portion 18*p* formed corresponding to the third contact hole CHp. The third conductive portion 18*p* includes a portion formed within the third contact hole CHp. The third conductive portion 18*p* is electrically connected to the third portion R12*e*2 of the outer trunk line 122 exposed in the third contact hole CHp.

The third conductive portion 18*p* is typically included in the same conductive layer as the first conductive portion 18*a*. That is, the third conductive portion 18*p* is included in, for example, the third conductive layer. The third conductive portion 18*p* is included in the same conductive layer as the pixel electrodes 5 included in the plurality of pixels P. The third conductive portion 18*p* can be formed of, for example, a transparent conductive material such as ITO, similarly to the first conductive portion 18*a*.

As described above, the first branch wiring line 140 and the outer trunk line 122 are electrically connected to each other at each first contact portion CPa. On the other hand, the third contact portion CPp having the third contact hole CHp through which another portion (the third portion R12*e*2 in the illustrated example) of the outer trunk line 122 is exposed is not for electrically connecting the first branch wiring line 140 and the outer trunk line 122. The third contact portion CPp may be referred to as a dummy contact portion. When the third contact portion CPp includes the third conductive portion 18*p*, the third conductive portion 18*p* is not connected to the first branch wiring line 140 in the third contact hole CHp. Furthermore, the third conductive portion 18*p* is not in contact with the first branch wiring line 140 in the third contact hole CHp. The third conductive portion 18*p* is not connected to any conductive portion included in the second conductive layer in the third contact hole CHp. The third conductive portion 18*p* is electrically connected to the first branch wiring line 140 via the outer trunk line 122 electrically connected in the third contact hole CHp. For this reason, the electric resistance value between the third portion R12*e*2 exposed in a certain third contact hole CHp and the first branch wiring line 140 closest to the third portion R12*e*2 (that is, the electric resistance value between the third portion R12*e*2 exposed in a certain third contact hole CHp and the first branch wiring line 140 having the lowest electric resistance value between the third portion R12*e*2 and the first branch wiring line 140 included in the display panel 1000*a*) is higher than the electric resistance value between the first portion R12*e*1 exposed in each first contact hole CHa and the first branch wiring line 140 electrically connected to the first portion R12*e*1 in the first contact hole CHa. Therefore, in both the case in which the third contact portion CPp includes the third conductive portion 18*p* and the case in which the third contact portion CPp does not include the third conductive portion 18*p*, the electric resistance value between the third portion R12*e*2 exposed in each third contact hole CHp and each of the plurality of first branch wiring lines 140 is higher than the electric resistance value between the first portion R12*e*1 exposed in each first contact hole CHa and the first branch wiring line 140 electrically connected to the first portion R12*e*1 in the first contact hole CHa.

Figure 22:
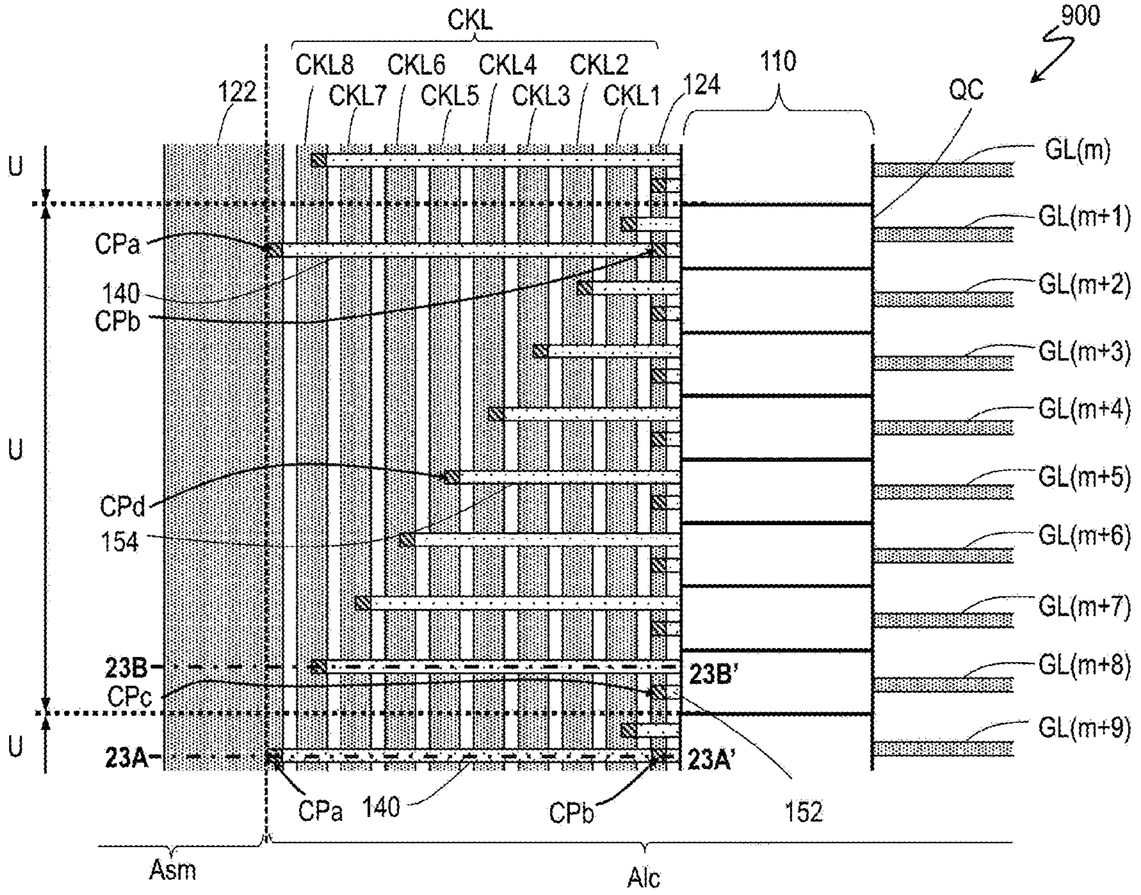
FIG. 22 is a schematic plan view of a display panel 900 of a comparative example and plan view illustrating a portion of peripheral region NA.
Figure 23A:
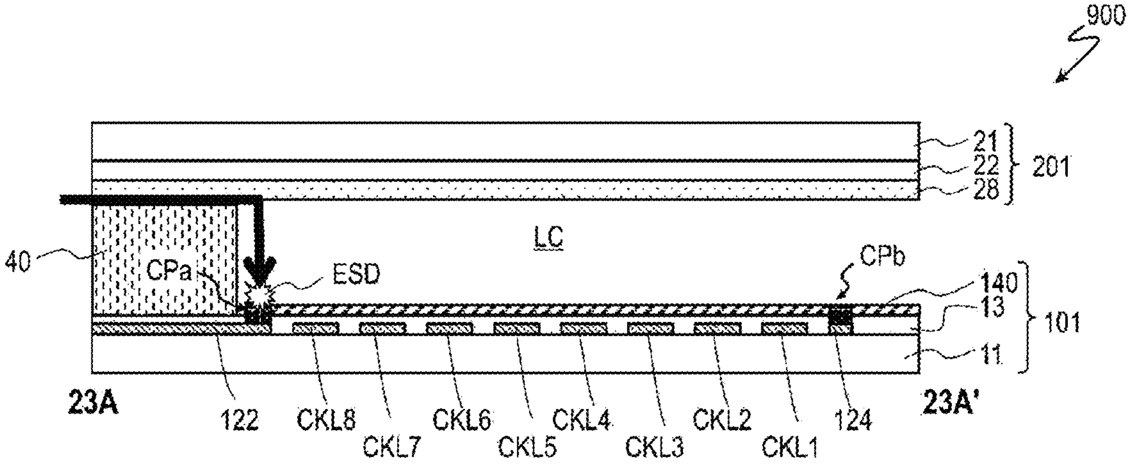
FIG. 23A is a schematic cross-sectional view of the display panel 900 of the comparative example and cross-sectional view taken along the line 23A-23A' in FIG. 22.
Figure 23B:
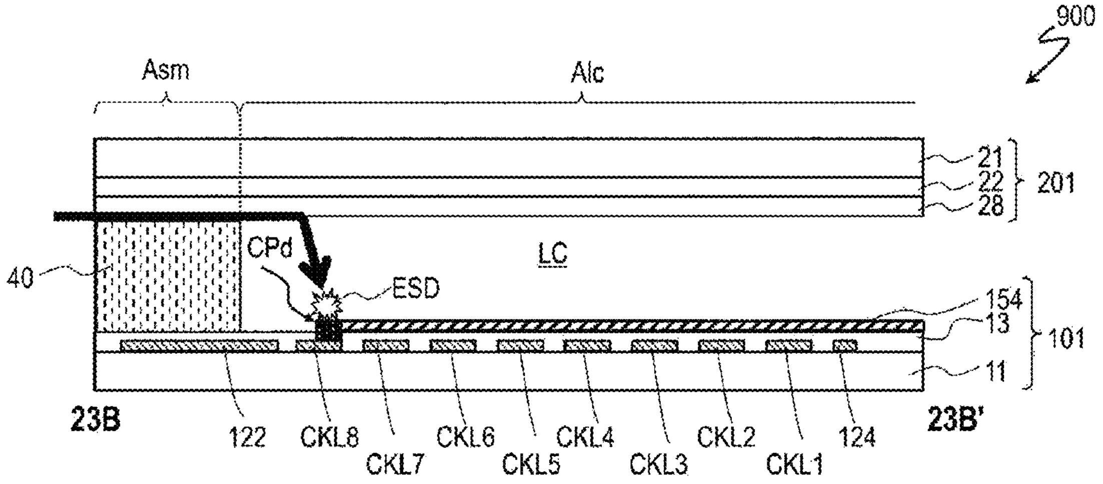
FIG. 23B is a schematic cross-sectional view of the display panel 900 of the comparative example and cross-sectional view taken along the line 23B-23B' in FIG. 22.

Since the display device 1100*a* includes the third contact portion CPp, occurrence of defects due to ESD is minimized. A display panel 900 of a comparative example will be described with reference to FIGS. 22, 23A, and 23B to describe the reason that the occurrence of defects caused by ESD in the display device 1100*a* is minimized. FIG. 22 is a schematic plan view of the display panel 900 of the comparative example and plan view illustrating a portion of a peripheral region NA. FIGS. 23A and 23B are cross-sectional views schematically illustrating the display panel 900 of the comparative example, FIG. 23A is a cross-sectional view taken along the line 23A-23A' in FIG. 22, and FIG. 23B is a cross-sectional view taken along the line 23B-23B' in FIG. 22.

As illustrated in FIG. 22, the display panel 900 of the comparative example is different from the display panel 1000*a* included in the display device 1100*a* in that the third contact portion CPp is not included.

As illustrated in FIG. 23A, the counter substrate 201 includes a color filter layer 22 supported by a substrate 21 (e.g., a glass substrate) and a transparent conductive layer 28 on the color filter layer 22. The color filter layer 22 may include a color filter and a black matrix BM. When the transparent conductive layer 28 is exposed at an end of the counter substrate 201, charge (static electricity) enters from an exposed portion of the transparent conductive layer 28, and the charge (static electricity) accumulated in the transparent conductive layer 28 may cause ESD at the interface between the transparent conductive layer 28 and the first contact portion CPa included in the TFT substrate 101 (in particular, between the transparent conductive layer 28 and the first conductive portion 18*a* when the first contact portion CPa is provided with the first conductive portion 18*a*). The arrow in the drawing schematically shows movement of charge. Since the first conductive portion 18*a* is in a close distance to the counter substrate 201 in the TFT substrate 101 in the peripheral region NA, ESD is likely to occur between the first conductive portion and the transparent conductive layer 28 of the counter substrate 201. In the display device having the display panel 900 of the comparative example, defects may occur due to ESD occurring in the first contact portion CPa. Specifically, for example, a circuit constituting the gate drive circuit GD may be damaged through the first branch wiring line 140 corresponding to the first contact portion CPa in which ESD has occurred. Alternatively, in the first contact portion CPa in which the ESD has occurred, for example, a problem such as melting of the first conductive portion 18*a* may occur, and thus connection failure may occur between the corresponding first branch wiring line 140 and the outer trunk line 122. Furthermore, in the first contact portion CPa in which ESD has occurred and in the vicinity thereof, the insulating layer may be broken to cause a short circuit with other wiring, which may cause excessive heat generation.

On the other hand, since the display device 1100*a* includes the third contact portion CPp, the charge accumulated in the transparent conductive layer 28 can be discharged toward the third contact portion CPp, and ESD can be induced at the interface between the transparent conductive layer 28 and the third contact portion CPp. When the third conductive portion 18*p* is provided in the third contact portion CPp, ESD can be induced at the interface between the transparent conductive layer 28 and the third conductive portion 18*p*. Therefore, it is possible to reduce the probability and frequency of the occurrence of ESD at the interface between the transparent conductive layer 28 and the first contact portion CPa due to the charge accumulated in the transparent conductive layer 28. Even when ESD occurs in the third contact portion CPp (the third conductive portion 18*p* when the third conductive portion 18*p* is provided in the third contact portion CPp), the third portion R12*e*2 of the outer trunk line 122 exposed in the third contact hole CHp in the third contact portion CPp is not in contact with the first branch wiring line 140 as described above, and thus, the influence on the electrical connection between the first branch wiring line 140 and the outer trunk line 122 is smaller than when ESD occurs in the first contact portion CPa. Furthermore, as described above, the electric resistance value between the third portion R12*e*2 exposed in each third contact hole CHp and each of the plurality of first branch wiring lines 140 is higher than the electric resistance value between the first portion R12*e*1 exposed in each first contact hole CHa and the first branch wiring line 140 electrically connected to the first portion R12*e*1 in the first contact hole CHa. Thus, even if ESD occurs in the third contact portion CPp, the charge flying to the third contact portion CPp (the third conductive portion 18*p* in a case that the third conductive portion 18*p* is provided in the third contact portion CPp) is attenuated before reaching the first branch wiring line 140. Therefore, the influence on the gate drive circuit GD via the first branch wiring line 140 is smaller than that when ESD occurs in the first contact portion CPa. In the display device 1100*a*, the occurrence of defects caused by ESD is minimized.

Furthermore, in the display panel 900 of the comparative example, as illustrated in FIG. 23B, ESD may occur at the interface between the transparent conductive layer 28 and the second contact portion CPd (the second conductive portion 18*d* when the second conductive portion 18*d* is provided in the second contact portion CPd) due to charge (static electricity) accumulated in the transparent conductive layer 28. In particular, ESD is likely to occur in the second contact portion CPd close to the sealing portion 40, that is, the second contact portion CPd electrically connecting the clock trunk line CKL far from the display region AA to the second branch wiring line 154. FIG. 23B illustrates an example in which ESD occurs at the second contact portion CPd electrically connecting the clock trunk line CKL8 farthest from the display region AA among the clock trunk lines CKL1 to CKL8 and the second branch wiring line 154. As described above, in the display device having the display panel 900 of the comparative example, defects may occur not only due to ESD occurring in the first contact portion CPa described above but also due to ESD occurring in the second contact portion CPd.

On the other hand, since the display device 1100*a* includes the third contact portion CPp as illustrated in FIG. 4B, the probability and frequency of occurrence of ESD at the interface between the transparent conductive layer 28 and the second contact portion CPd (the second conductive portion 18*d* when the second conductive portion 18*d* is provided in the second contact portion CPd) can also be reduced by the charge accumulated in the transparent conductive layer 28. The third contact portion CPp is disposed farther from the display region AA than the second contact portion CPd. For example, the position of the third contact portion CPp in the row direction is farther from the display region AA than the position of the second contact portion CPd in the row direction. That is, since the distance between the third contact portion CPp and the sealing portion 40 is shorter than that between the second contact portion CPd and the sealing portion 40, it is possible to effectively reduce the probability and frequency of occurrence of ESD in the second contact portion CPd. In the display device 1100*a*, the occurrence of defects caused by ESD is minimized.

The display panel 1000*a* may include a plurality of third contact portions CPp. As in the example of FIG. 3, the number of third contact portions CPp (i.e., the number of third contact holes CHp) is preferably larger than the number of first contact portions CPa (i.e., the number of first contact holes CHa). In such a case, it is possible to induce ESD toward the conductive portion (e.g., the third conductive portion 18*p*) of the third contact portion CPp and effectively minimize the occurrence of ESD at the first contact portion CPa.

In the example illustrated in FIG. 3, in a plan view, the first contact portions CPa and the third contact portions CPp are arrayed in the direction in which the sealing portion 40 extends (the Y direction in FIG. 3). That is, in a plan view, the arrangement position xa of the first contact portion CPa in the row direction (the X direction in FIG. 3) coincides with the arrangement position xp of the third contact portion CPp in the row direction (xa=xp). The arrangement position of the first contact portion CPa in the row direction in a plan view is the position of the reference point of the first contact portion CPa in the row direction in a plan view. The reference point of the first contact portion CPa in a plan view can be arbitrarily determined, and can be, for example, the center point of the first contact hole CHa included in the first contact portion CPa in the row direction in a plan view or the center point of the first conductive portion 18*a* included in the first contact portion CPa in the row direction in a plan view. The arrangement position of the first contact portion CPa in the row direction in a plan view can be rephrased as the arrangement position of the first contact hole CHa in the row direction in a plan view or the arrangement position of the first conductive portion 18*a* in the row direction in a plan view. The same applies to the second contact portion CPd and the third contact portion CPp.

In the example illustrated in FIG. 3, assuming that the arrangement position of the plurality of first contact portions CPa in the column direction is a first position and the arrangement position of the plurality of third contact portions CPp in the column direction is a third position, the plurality of first contact portions CPa and the plurality of third contact portions CPp are formed such that a plurality of third positions are present between two first positions adjacent to each other in the column direction. In such a case, ESD is induced toward the third contact portion CPp (the third conductive portion 18*p* when the third conductive portion 18*p* is provided at the third contact portion CPp), and the occurrence of ESD at the first contact portion CPa can be effectively minimized.

Although the third conductive portion 18*p* of the third contact portion CPp may be included in any of the conductive layers included in the TFT substrate 101 of the display panel 1000*a*, the third conductive portion is preferably included in the same conductive layer (the third conductive layer in this example) as the first conductive portion 18*a* and the second conductive portion 18*d*. When the third conductive portion 18*p* is included in the same conductive layer as the first conductive portion 18*a* and the second conductive portion 18*d*, the height of the third conductive portion 18*p* is equal to the height of the first conductive portion 18*a* and the height of the second conductive portion 18*d*. At this time, a distance d3*p* from the counter substrate 201 to the third conductive portion 18*p* is equal to the distance d1*a* from the counter substrate 201 to the first conductive portion 18*a* and the distance from the counter substrate 201 to the second conductive portion 18*d*. Here, the distances from the counter substrate 201 to the first conductive portion 18*a*, to the second conductive portion 18*d*, and to the third conductive portion 18*p* are distances in the normal direction of the TFT substrate 101 or the counter substrate 201.

In the example illustrated in FIG. 4A, the distance d3*p* from the counter substrate 201 to the third conductive portion 18*p* is equal to the distance d1*a* from the counter substrate 201 to the first conductive portion 18*a*. In this case, compared to the case in which the distance d3*p* from the counter substrate 201 to the third conductive portion 18*p* is longer than the distance d1*a* from the counter substrate 201 to the first conductive portion 18*a*, it is advantageous from the viewpoint of inducing discharge of the charge accumulated in the transparent conductive layer 28 toward the third conductive portion 18*p* of the third contact portion CPp. Note that, from the viewpoint of reducing the probability and the frequency of occurrence of ESD in the first conductive portion 18*a* of the first contact portion CPa, it is more preferable to make the distance from the counter substrate 201 to the third conductive portion 18*p* shorter than the distance from the counter substrate 201 to the first conductive portion 18*a*; however, formation of an additional layer to shorten the distance from the counter substrate 201 to the third conductive portion 18*p* may increase the manufacturing process and the manufacturing cost. On the other hand, when the third conductive portion 18*p* is included in the same conductive layer as the first conductive portion 18*a*, that is, when the third conductive portion 18*p* is formed of the same conductive film as the first conductive portion 18*a*, the occurrence of ESD at the first conductive portion 18*a* of the first contact portion CPa can be minimized while the increase in the manufacturing process and the manufacturing cost for providing the third contact portion CPp is minimized.

In FIG. 3, a region in which the sealing portion 40 is provided is shown as a region Asm, and a region in which the liquid crystal layer LC is provided is shown as a region Alc. As in the example illustrated in FIG. 3, it is preferable that the first conductive portion 18*a*, the second conductive portion 18*d*, and the third conductive portion 18*p* do not overlap the sealing portion 40 in a plan view (that is, be exposed from the sealing portion 40). When the first contact portion CPa is arranged to overlap the sealing portion 40 in a plan view, that is, when the first conductive portion 18*a* is covered with the sealing portion 40, the sealing portion 40 is formed on the first conductive portion 18*a* reflecting the uneven shape of the first contact hole CHa included in the first contact portion CPa, and thus the TFT substrate 101 and the counter substrate 201 may not be bonded with sufficient strength by the sealing portion 40. Similarly, when the second conductive portion 18*d* and/or the third conductive portion 18*p* is covered with the sealing portion 40, the TFT substrate 101 and the counter substrate 201 may not be bonded to each other with sufficient strength by the sealing portion 40. In particular, when the number of the first contact portions CPa, the second contact portions CPd, and the third contact portions CPp arranged to overlap the sealing portion 40 is large, the adhesive force of the sealing portion 40 tends to be weak. On the other hand, when the first conductive portion 18*a*, the second conductive portion 18*d*, and the third conductive portion 18*p* are exposed from the sealing portion 40, even if the number of the first contact portions CPa, the second contact portions CPd, and the third contact portions CPp increases, the adhesiveness of the sealing portion 40 is not affected.

A width of the outer trunk line 122 in the row direction is larger than a width of the inner trunk line 124 in the row direction in the example of FIG. 3. By adopting a configuration in which the width of the outer trunk line 122 in the row direction disposed farther from the display region AA is larger than the width of the inner trunk line 124 in the row direction disposed closer to the display region AA, an increase in the area in which the first branch wiring line 140 overlaps another trunk line (in particular, a trunk line extending in the column direction) in a plan view can be minimized, and therefore it is possible to minimize an increase in the parasitic capacitance formed therebetween. In addition, when the width of the outer trunk line 122 in the row direction is set to be large, the width of the inner trunk line 124 in the row direction can be reduced while minimizing an increase in the resistance value of the outer trunk line 122, and thus the area in which the inner trunk line 124 overlaps the second branch wiring line 154 electrically connecting each clock trunk line CKL and each stage of the shift register 110 in a plan view can be reduced to a small size. Therefore, an increase in parasitic capacitance formed between the second branch wiring line 154 and the inner trunk line 124 can be minimized. By minimizing an increase in the parasitic capacitance formed between the wiring line groups, an increase in the amount of current flowing through wiring lines can be minimized, and as a result, the occurrence of excessive heat generation can be minimized.

In the display panel 1000*a* described above, the third portion exposed in the third contact hole CHp is a portion of the outer trunk line 122. The configuration is not limited to this example, and the third portion exposed in the third contact hole CHp may be a portion of an island-shaped conductive portion included in the same conductive layer (i.e., the first conductive layer) as the outer trunk line 122 and disposed to be separated from the outer trunk line 122, as described in third to sixth embodiments to be described below. In either case, the range of the third portion in the row direction overlaps the range of the outer trunk line 122 in the row direction, and the range of the third portion in the column direction overlaps the range of the outer trunk line 122 in the column direction.

Second Embodiment

Figure 8:
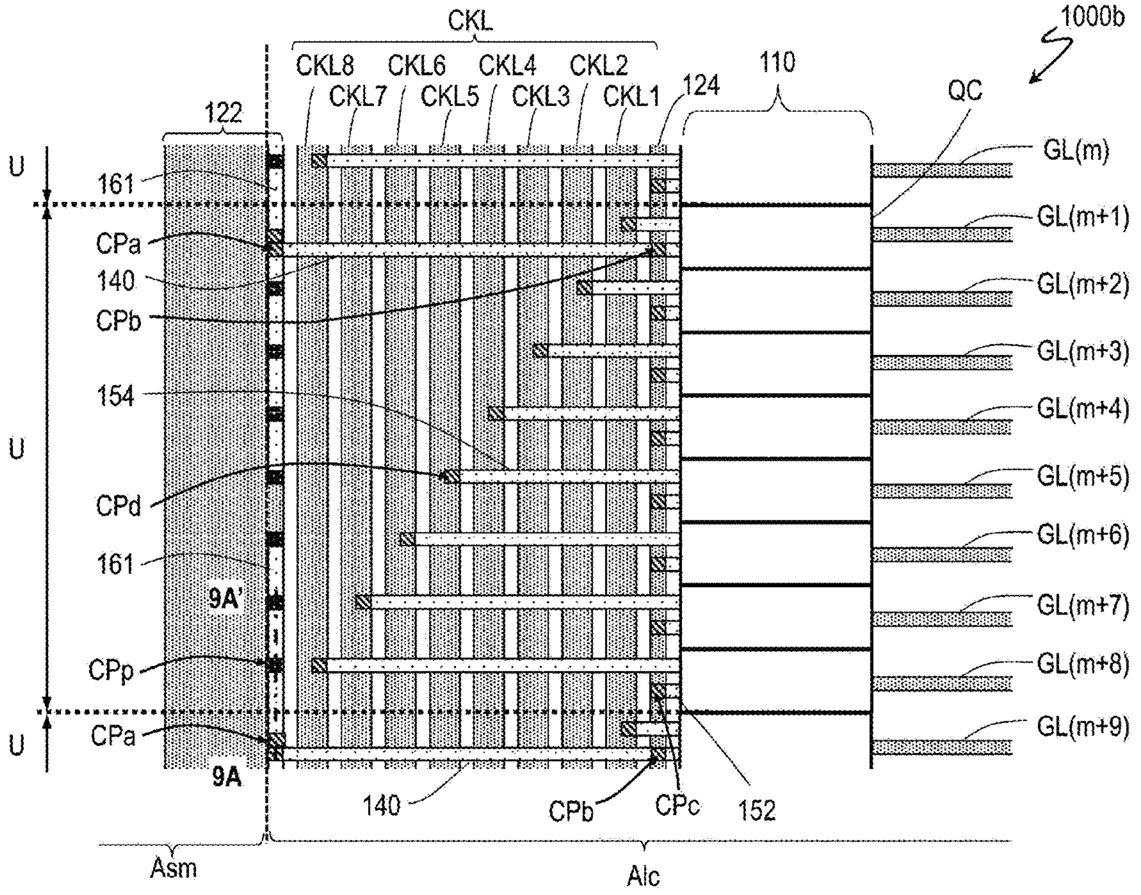
FIG. 8 is a schematic plan view of a display panel 1000*b* of a display device according to a second embodiment and plan view illustrating a portion of a peripheral region NA.
Figure 9:
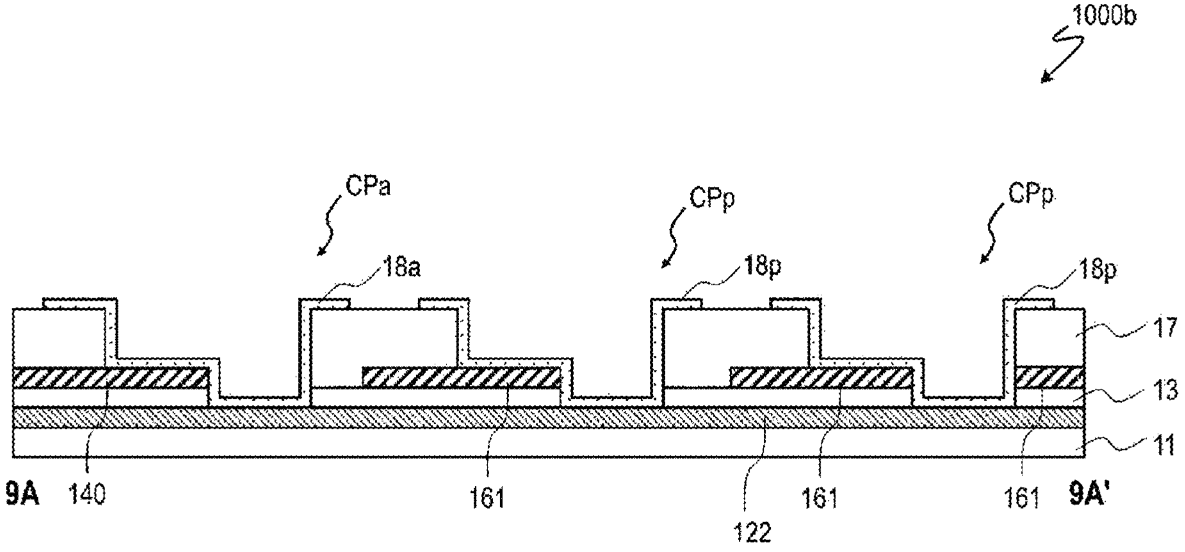
FIG. 9 is a schematic cross-sectional view of the display panel 1000*b* and cross-sectional view taken along the line 9A-9A' in FIG. 8.

A display panel 1000*b* included in a display device according to the present embodiment will now be described with reference to FIGS. 8 and 9. FIG. 8 is a schematic plan view of the display panel 1000*b* and plan view schematically illustrating a portion of a peripheral region NA. FIG. 9 is a schematic cross-sectional view of the display panel 1000*b* and cross-sectional view taken along the line 9A-9A' in FIG. 8. Note that, for simplicity, only a TFT substrate 101 included in the display panel 1000*b* is illustrated in FIG. 9. The following mainly describes differences from the previous embodiment.

The display panel 1000*b* is different from the display panel 1000*a* in that the former further includes connecting portions 161 electrically connecting third conductive portions 18*p* of two or more third contact portions CPp. The connecting portions 161 are included in a conductive layer different from the outer trunk line 122. In this example, the connecting portions 161 are included in the same conductive layer (that is, the second conductive layer) as the first branch wiring line 140. For example, the connecting portions 161 are included in the source metal layer. The connecting portions 161 at least partially overlap the outer trunk line 122 in a plan view (i.e., when viewed from the normal direction of the TFT substrate 101). In this example, the connecting portions 161 extend in the column direction.

Figure 10:
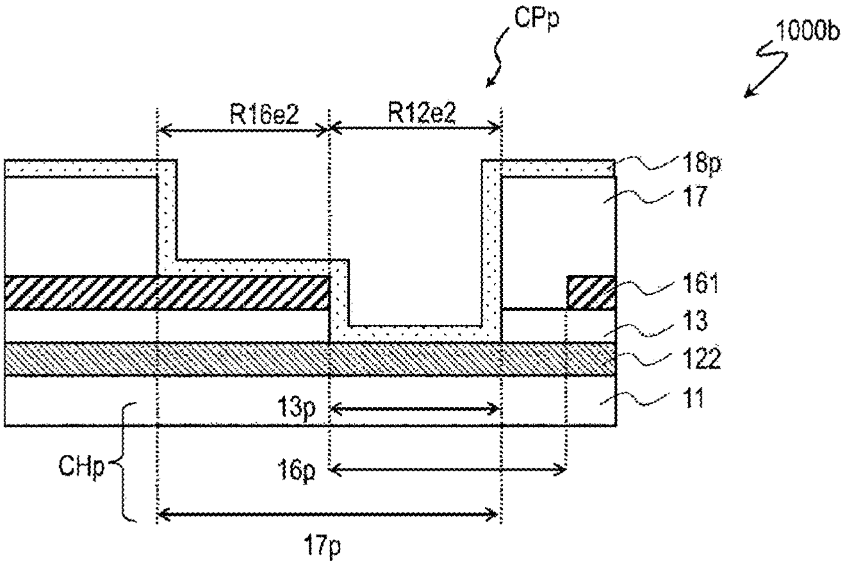
FIG. 10 is a schematic cross-sectional view of a third contact portion CPp of the display panel 1000*b*.

An example of a structure of the third contact portion CPp included in the display panel 1000*b* will be described also with reference to FIG. 10. FIG. 10 is a schematic cross-sectional view of the third contact portion CPp included in the display panel 1000*b*.

As illustrated in FIG. 10, the third contact portion CPp has a third contact hole CHp through which another portion of the outer trunk line 122 (a third portion R12*e*2 in the illustrated example) and a portion of the connecting portion 161 (a third portion R16*e*2 in the illustrated example) are exposed. In the third contact hole CHp, the third portion R12*e*2 of the outer trunk line 122 and the third portion R16*e*2 of the connecting portion 161 are electrically connected to each other. In the example illustrated in FIG. 10, the third contact portion CPp further includes a third conductive portion 18*p* formed corresponding to the third contact hole CHp. The third conductive portion 18*p* includes a portion formed within the third contact hole CHp. The third conductive portion 18*p* is electrically connected to the third portion R12*e*2 of the outer trunk line 122 exposed in the third contact hole CHp and the third portion R16*e*2 of the connecting portion 161.

In the display device having the display panel 1000*b*, by including the third contact portion CPp, the occurrence of ESD in the first contact portion CPa and the second contact portion CPd and the occurrence of defects caused by the ESD are minimized, as in the display device 1100*a*. In the display panel 1000*b*, the third portion R12*e*2 of the outer trunk line 122 exposed inside the third contact hole CHp in the third contact portion CPp is not in contact with the first branch wiring line 140. When the third conductive portion 18*p* is provided in the third contact portion CPp as in the illustrated example, the third conductive portion 18*p* is electrically connected to the first branch wiring line 140 via the third portion R12*e*2 of the outer trunk line 122 and/or the connecting portion 161 electrically connected in the third contact hole CHp. For this reason, the electric resistance value between the third portion R12*e*2 exposed in a certain third contact hole CHp and the first branch wiring line 140 closest to the third portion R12*e*2 (that is, the electric resistance value between the third portion R12*e*2 exposed in a certain third contact hole CHp and the first branch wiring line 140 having the lowest electric resistance value between the third portion R12*e*2 and the first branch wiring line 140 included in the display panel 1000*a*) is higher than the electric resistance value between the first portion R12*e*1 exposed in each first contact hole CHa and the first branch wiring line 140 electrically connected to the first portion R12*e*1 in the first contact hole CHa. That is, the electric resistance value between the third portion R12*e*2 exposed in each third contact hole CHp and each of the plurality of first branch wiring lines 140 is higher than the electric resistance value between the first portion R12*e*1 exposed in each first contact hole CHa and the first branch wiring line 140 electrically connected to the first portion R12*e*1 in the first contact hole CHa.

The connecting portions 161 may be provided to electrically connect the third conductive portions 18*p* of any two or more third contact portions CPp among the plurality of third contact portions CPp included in the display panel 1000*b*. The connecting portions 161 may be provided to electrically connect all of the plurality of third contact portions CPp included in the display panel 1000*b*, or may be provided to electrically connect only some (any two or more) of the plurality of third contact portions CPp included in the display panel 1000*b*. The connecting portions 161 may be formed to further electrically connect two or more electrically connected third conductive portions 18*p* to any one of the plurality of first conductive portions 18*a* included in the display panel 1000*b*.

Third Embodiment

Figure 11:
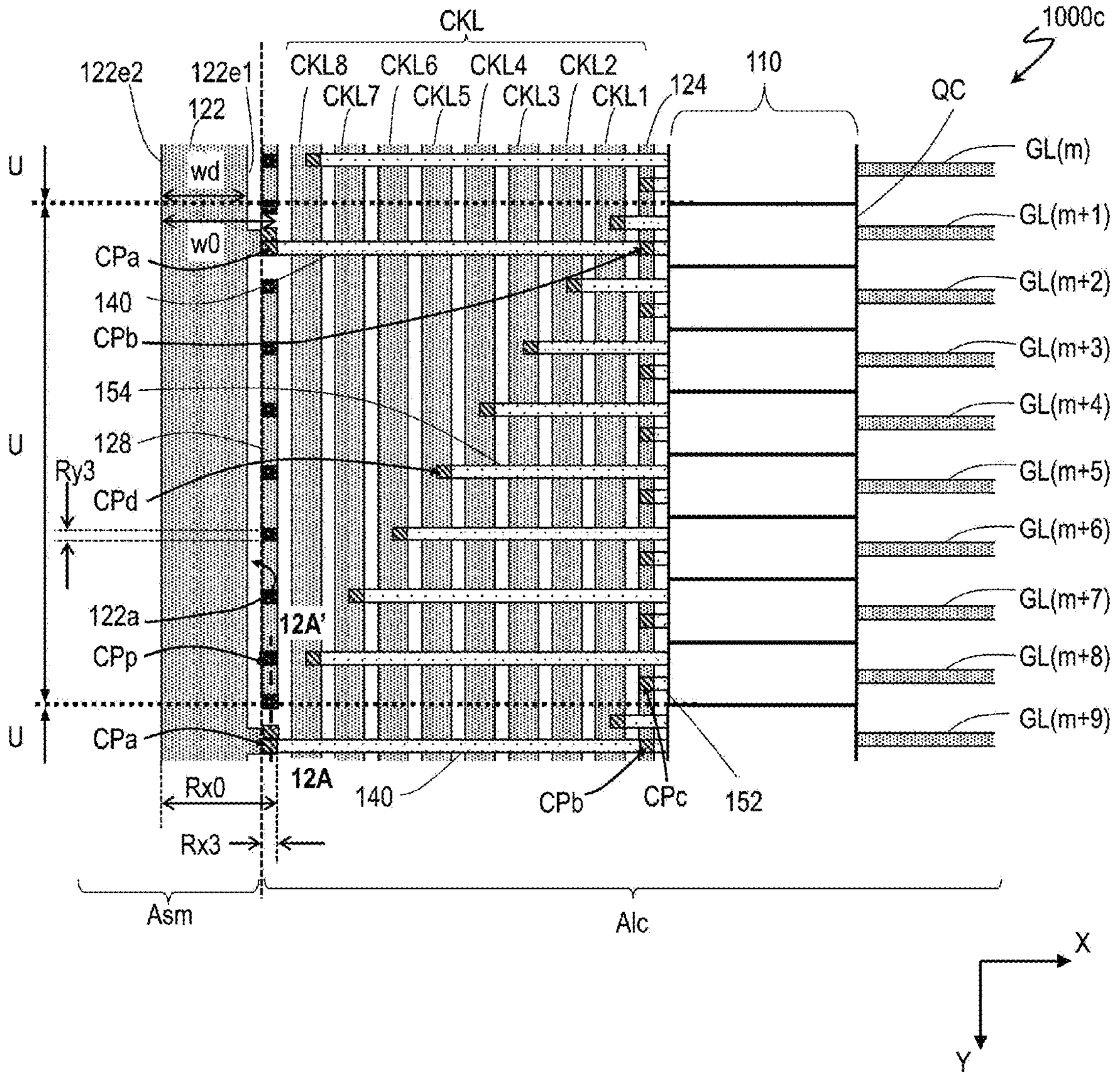
FIG. 11 is a schematic plan view of a display panel 1000*c* of a display device according to a third embodiment and plan view illustrating a portion of a peripheral region NA.
Figure 12:
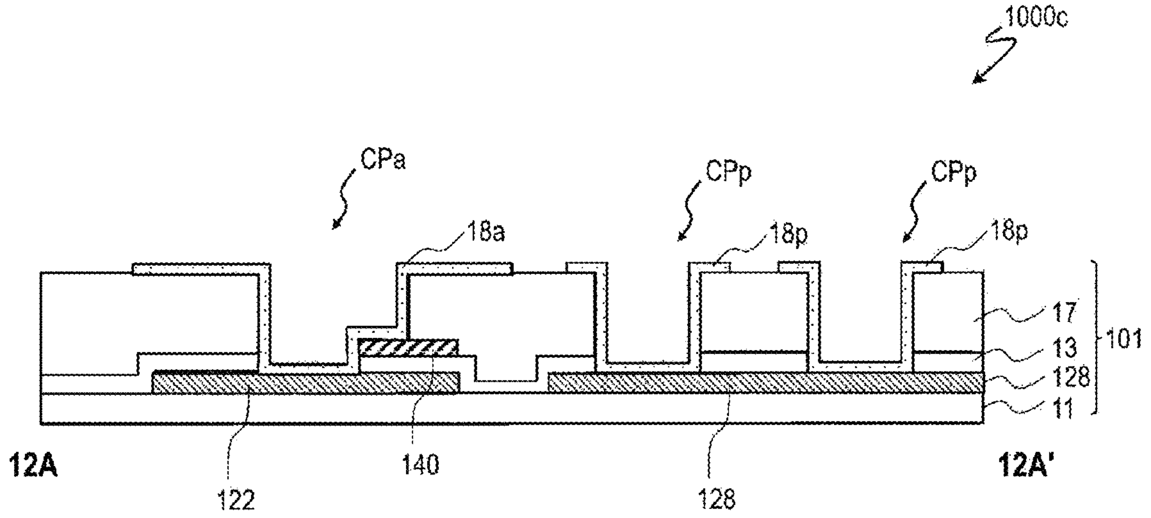
FIG. 12 is a schematic cross-sectional view of the display panel 1000*c* and cross-sectional view taken along the line 12A-12A' in FIG. 11.

A display panel 1000*c* included in a display device according to the present embodiment will now be described with reference to FIGS. 11 and 12. FIG. 11 is a schematic plan view of the display panel 1000*c* and plan view schematically illustrating a portion of a peripheral region NA. FIG. 12 is a schematic cross-sectional view of the display panel 1000*c* and cross-sectional view taken along the line 12A-12A' in FIG. 11. Note that, for simplicity, only a TFT substrate 101 included in the display panel 1000*c* is illustrated in FIG. 12. The following mainly describes differences from the previous embodiment.

The display panel 1000*c* is different from the display panel 1000*a* in that the outer trunk line 122 has one or more notched portions 122*a* and has one or more island-shaped conductive portions 128 formed in the notched portions 122*a*. Furthermore, the display panel 1000*c* is different from the display panel 1000*a* in that the third contact portion CPp is provided on the island-shaped conductive portions 128.

The outer trunk line 122 includes a first edge 122*e*1 and a second edge 122*e*2 which are edges on both sides in the row direction, the first edge 122*e*1 on the display region AA side and the second edge 122*e*2 on the opposite side to the display region AA. In the example illustrated in FIG. 11, a notched portion 122*a* is formed on the first edge 122*e*1 of the outer trunk line 122. A notched portion 122*a* may be formed on the second edge 122*e*2 of the outer trunk line 122. In the outer trunk line 122, a length wd in the row direction of the portion in which the notched portion 122*a* is formed is smaller than a length wo in the row direction of the portion in which the notched portion 122*a* is not formed. A plurality of notched portions 122*a* may be formed on the first edge 122*e*1 of the outer trunk line 122. In the example illustrated in FIG. 11, each of the plurality of notched portions 122*a* is formed between adjacent first branch wiring lines 140 among the plurality of first branch wiring lines 140. In the example illustrated in FIG. 11, the notched portion 122*a* is formed such that the notched portion 122*a* does not overlap the first contact portion CPa (the first contact hole CHa and/or the first conductive portion 18*a*) in a plan view. That is, the first contact portion CPa is formed in a portion of the outer trunk line 122 in which the notched portion 122*a* is not formed. In the example illustrated in FIG. 11, the notched portion 122*a* and the island-shaped conductive portion 128 are provided between the adjacent first contact portions CPa in a plan view. Note that shapes of the notched portion 122*a* and the island-shaped conductive portion 128 in a plan view are not limited to the illustrated examples, and can be arbitrarily modified.

The island-shaped conductive portion 128 is formed in the notched portion 122*a* to be separated from the outer trunk line 122. The island-shaped conductive portion 128 is included in the same conductive layer (i.e., the first conductive layer) as the outer trunk line 122. For example, the island-shaped conductive portion 128 is included in the gate metal layer. When a plurality of notched portions 122*a* are formed on the first edge 122*e*1 of the outer trunk line 122, the plurality of island-shaped conductive portions 128 may be provided such that the island-shaped conductive portions 128 are formed in each of the plurality of notched portions 122*a*. In the example illustrated in FIG. 11, each of the plurality of island-shaped conductive portions 128 is provided between adjacent first branch wiring lines 140.

In the example illustrated in FIG. 11, a plurality of third contact portions CPp are provided corresponding to one island-shaped conductive portion 128.

Figure 13:
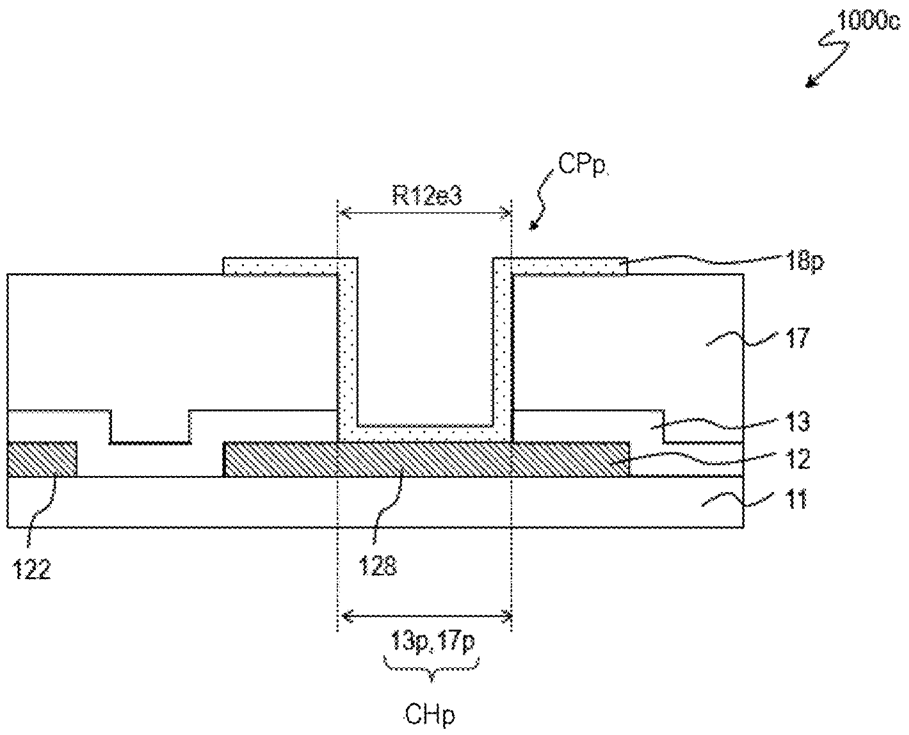
FIG. 13 is a schematic cross-sectional view of a third contact portion CPp of the display panel 1000*c*.

An example of a structure of the third contact portion CPp included in the display panel 1000*c* will be described also with reference to FIG. 13. FIG. 13 is a schematic cross-sectional view of the third contact portion CPp included in the display panel 1000*c*.

The third contact portion CPp included in the display panel 1000*c* includes a third contact hole CHp through which a portion (the third portion R12*e*3 in the illustrated example) of the island-shaped conductive portion 128 is exposed. In the example of FIG. 13, the third contact portion CPp included in the display panel 1000*c* further includes a third conductive portion 18*p* formed corresponding to the third contact hole CHp. The third conductive portion 18*p* includes a portion formed within the third contact hole CHp. The third conductive portion 18*p* is electrically connected to the third portion R12*e*3 of the island-shaped conductive portion 128 exposed in the third contact hole CHp. The third conductive portion 18*p* is not connected to any conductive portion included in the second conductive layer in the third contact hole CHp. The third conductive portion 18*p* is not connected to the first branch wiring line 140 in the third contact hole CHp. The third conductive portion 18*p* is not in contact with the first branch wiring line 140 in the third contact hole CHp.

A range Rx3, in the row direction (X direction in the drawing), of the third portion R12*e*3 of the island-shaped conductive portion 128 exposed in the third contact hole CHp overlaps a range Rx0 of the outer trunk line 122 in the row direction, and a range Ry3 of the third portion R12*e*3 in the column direction (Y direction in the drawing) overlaps a range of the outer trunk line 122 in the column direction.

The third conductive portion 18*p* included in the display panel 1000*c* is included in the third conductive layer, similarly to the third conductive portion 18*p* included in the display panel 1000*a*. The third conductive portion 18*p* included in the display panel 1000*c* can be formed of the same conductive film and/or the same material as the third conductive portion 18*p* included in the display panel 1000*a*. The arrangement position, the number, and the like of the third conductive portions 18*p* included in the display panel 1000*c* may be the same as those of the third conductive portions 18*p* included in the display panel 1000*a* described above. In the example of FIG. 11, similarly to the display panel 1000*a*, the arrangement position of the first contact portion CPa in the row direction coincides with the arrangement position of the third contact portion CPp in the row direction in a plan view. In the illustrated example, the third conductive portion 18*p* included in the display panel 1000*c* does not overlap the sealing portion 40 in a plan view. The island-shaped conductive portion 128 may also be formed not to overlap the sealing portion 40 in a plan view.

In the display device having the display panel 1000*c*, by including the third contact portion CPp, the occurrence of ESD in the first contact portion CPa and the second contact portion CPd and the occurrence of defects caused by the ESD are minimized, as in the display device 1100*a*. Although the third conductive portion 18*p* is electrically connected to the island-shaped conductive portion 128 in the third contact hole CHp in the display panel 1000*c*, the island-shaped conductive portion 128 is formed isolated from the outer trunk line 122, and the island-shaped conductive portion 128 and the outer trunk line 122 are not electrically connected to each other. Thus, in the display panel 1000*c*, the electric resistance value between the third portion R12*e*3 of the island-shaped conductive portion 128 exposed in each third contact hole CHp and each of the plurality of first branch wiring lines 140 is higher than the electric resistance value between the first portion R12*e*1 exposed in each first contact hole CHa and the first branch wiring line 140 electrically connected to the first portion R12*e*1 in the first contact hole CHa.

In the display panel 1000*c*, since the third conductive portion 18*p* is substantially insulated from the first branch wiring line 140, when ESD occurs in the third conductive portion 18*p* of the third contact portion CPp, the influence on the electrical connection between the first branch wiring line 140 and the outer trunk line 122 and the influence on the gate drive circuit GD via the first branch wiring line 140 are smaller than that in the display panel 1000*a*. In the display panel 1000*c*, the occurrence of defects caused by ESD can be more effectively minimized than in the display panel 1000*a*.

Fourth Embodiment

Figure 14:
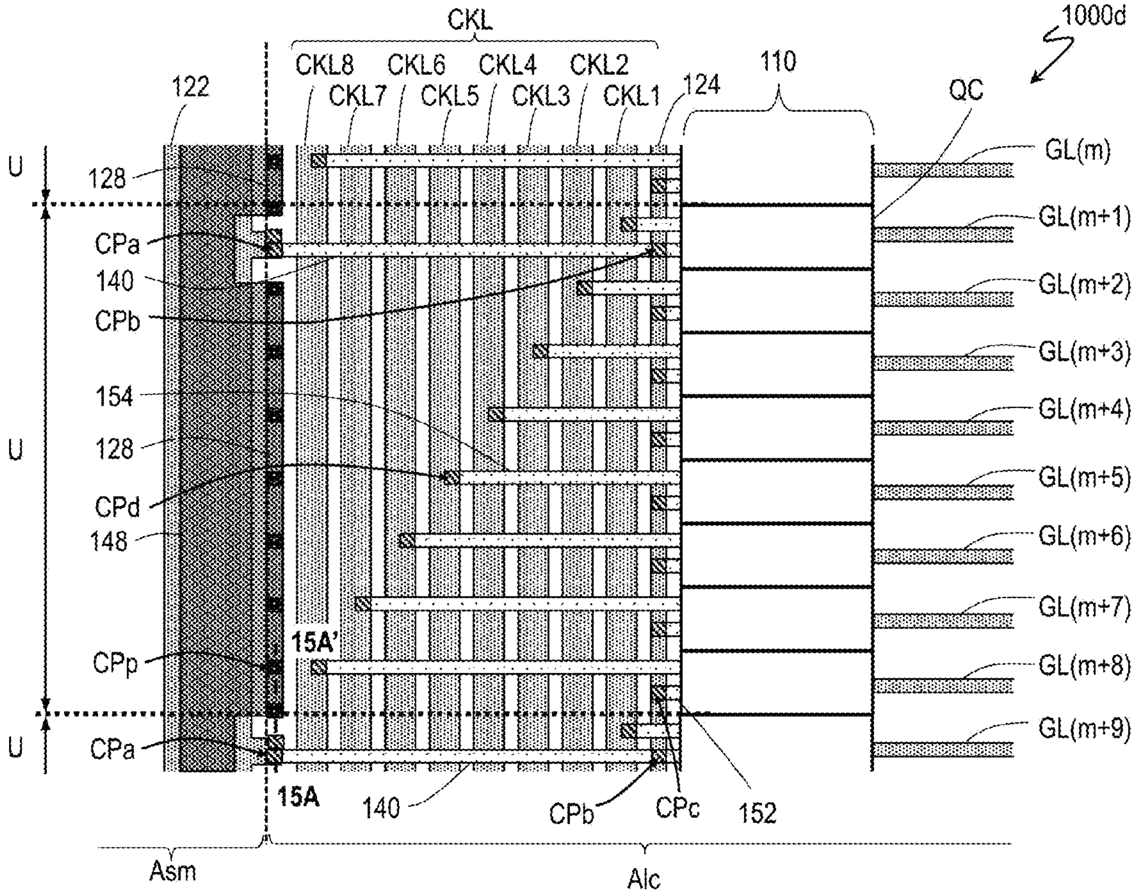
FIG. 14 is a schematic plan view of a display panel 1000*d* of a display device according to a fourth embodiment and plan view illustrating a portion of a peripheral region NA.
Figure 15:
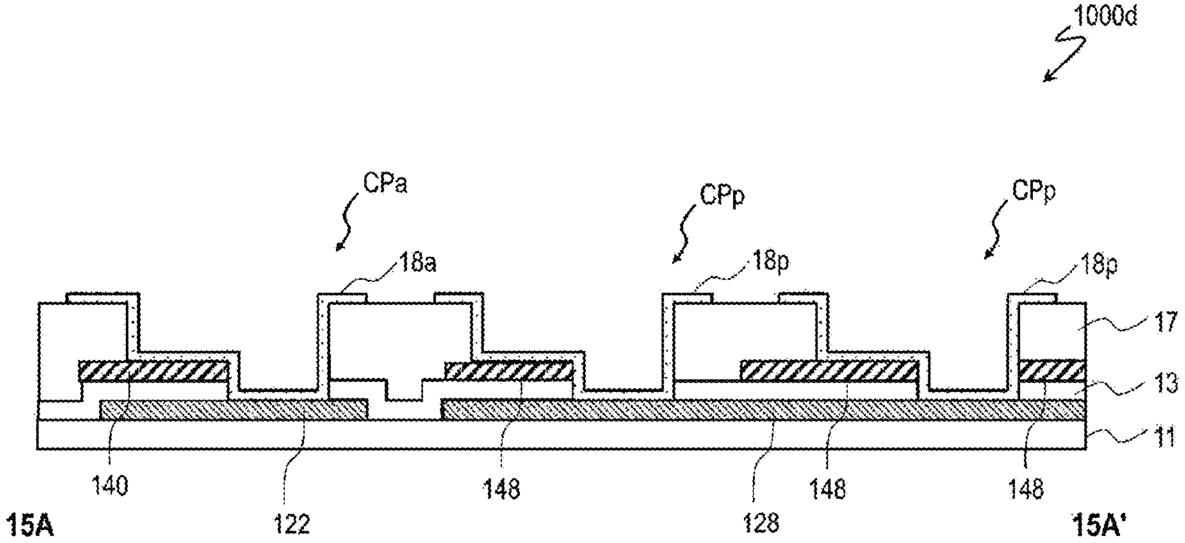
FIG. 15 is a schematic cross-sectional view of the display panel 1000*d* and cross-sectional view taken along the line 15A-15A' in FIG. 14.

A display panel 1000*d* included in a display device according to the present embodiment will now be described with reference to FIGS. 14 and 15. FIG. 14 is a schematic plan view of the display panel 1000*d* and plan view schematically illustrating a portion of a peripheral region NA. FIG. 15 is a schematic cross-sectional view of the display panel 1000*d* and cross-sectional view taken along the line 15A-15A' in FIG. 14. Note that, for simplicity, only a TFT substrate 101 included in the display panel 1000*d* is illustrated in FIG. 15. The following mainly describes differences from the previous embodiment.

The display panel 1000*d* is different from the display panel 1000*c* in that the former further includes first connecting portions 148 electrically connecting third conductive portions 18*p* of two or more third contact portions CPp. The first connecting portions 148 are included in a conductive layer different from the outer trunk line 122. In this example, the first connecting portions 148 are included in the same conductive layer (that is, the second conductive layer) as the first branch wiring line 140. For example, the first connecting portions 148 are included in the source metal layer. The first connecting portions 148 at least partially overlap the island-shaped conductive portion 128 and at least partially overlap the outer trunk line 122 in a plan view (i.e., when viewed from the normal direction of the TFT substrate 101). In addition, the first connecting portions 148 are formed not to overlap the first contact portions CPa in a plan view.

Figure 16:
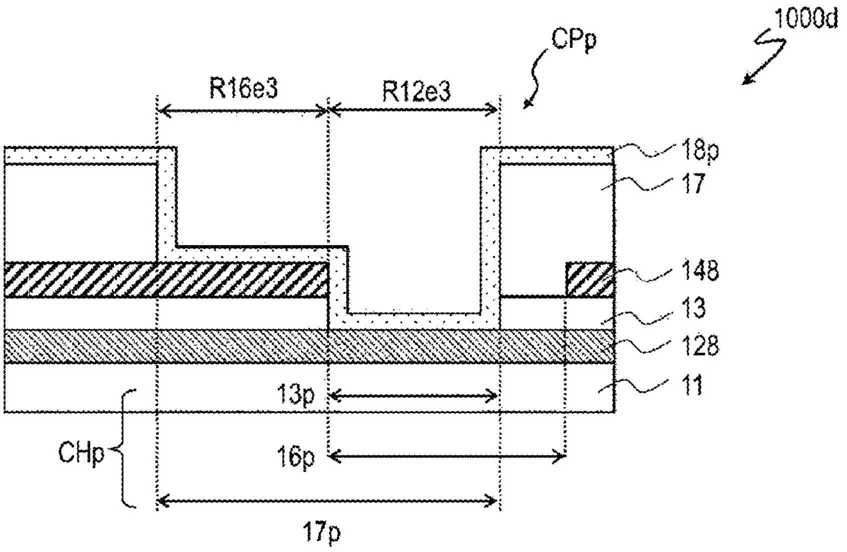
FIG. 16 is a schematic cross-sectional view of a third contact portion CPp of the display panel 1000*d*.

An example of a structure of the third contact portion CPp included in the display panel 1000*d* will be described also with reference to FIG. 16. FIG. 16 is a schematic cross-sectional view of the third contact portion CPp included in the display panel 1000*d*.

As illustrated in FIG. 16, in the third contact portion CPp, a portion (the third portion R12*e*3 in the illustrated example) of the island-shaped conductive portion 128 and a portion (the third portion R16*e*3 in the illustrated example) of the first connecting portion 148 are electrically connected to each other. The third contact portion CPp includes a third contact hole CHp through which the third portion R12*e*3 of the island-shaped conductive portion 128 and the third portion R16*e*3 of the first connecting portion 148 are exposed. In the example of FIG. 16, the third contact portion CPp further includes a third conductive portion 18*p* formed corresponding to the third contact hole CHp. The third conductive portion 18*p* includes a portion formed within the third contact hole CHp. The third conductive portion 18*p* is electrically connected to the third portion R12*e*3 of the island-shaped conductive portion 128 and the third portion R16*e*3 of the first connecting portion 148 exposed in the third contact hole CHp.

Also in the display device having the display panel 1000*d*, by including the third contact portion CPp, the occurrence of ESD in the first contact portion CPa and the second contact portion CPd and the occurrence of defects caused by the ESD are minimized, as in the display device having the display panel 1000*c*.

Since the first connecting portion 148 at least partially overlaps the outer trunk line 122 in a plan view, a capacitance element is formed by the first connecting portion 148, the outer trunk line 122, and an insulating layer therebetween (in this example, the gate insulating layer 13). When ESD occurs in the third contact portion CPp (the third conductive portion 18*p* when the third contact portion CPp includes the third conductive portion 18*p*), charge discharged from the transparent conductive layer 28 of the counter substrate 201 to the third conductive portion 18*p* can be charged to the capacitance element via the first connecting portion 148. Therefore, since the impact from ESD can be absorbed, the display panel 1000*d* has a higher effect of minimizing the occurrence of defects caused by the ESD than the display panel 1000*c*. Here, since the first connecting portion 148 is not electrically connected to the outer trunk line 122, the first connecting portion 148 and the outer trunk line 122 can receive supply of potential at different levels. From the viewpoint of charging the capacitance element with the charge discharged to the third contact portion CPp, the potential of the first connecting portion 148 and the potential of the outer trunk line 122 are preferably different from each other. In addition, even when the first connecting portion 148 does not overlap the outer trunk line 122 in a plan view, a capacitance element can be formed by the first connecting portion 148, the outer trunk line 122, and the insulating layer therebetween; however, from the viewpoint of charging the capacitance element with charge discharged from the transparent conductive layer 28 to the third contact portion CPp, it is preferable that the electrostatic capacitance value of the capacitance element be high, and thus it is preferable that the first connecting portion 148 at least partially overlap with the outer trunk line 122 in a plan view.

The first connecting portions 148 may be provided to electrically connect the third conductive portions 18*p* of any two or more third contact portions CPp among the plurality of third contact portions CPp included in the display panel 1000*d*. The first connecting portions 148 may be provided to electrically connect all of the plurality of third contact portions CPp included in the display panel 1000*d*, or may be provided to electrically connect only some (any two or more) of the plurality of third contact portions CPp included in the display panel 1000*d*. The first connecting portions 148 may be provided to electrically connect two or more third conductive portions 18*p* electrically connected to different island-shaped conductive portions 128 from among the plurality of third conductive portions 18*p* included in the display panel 1000*d*.

Fifth Embodiment

Figure 17A:
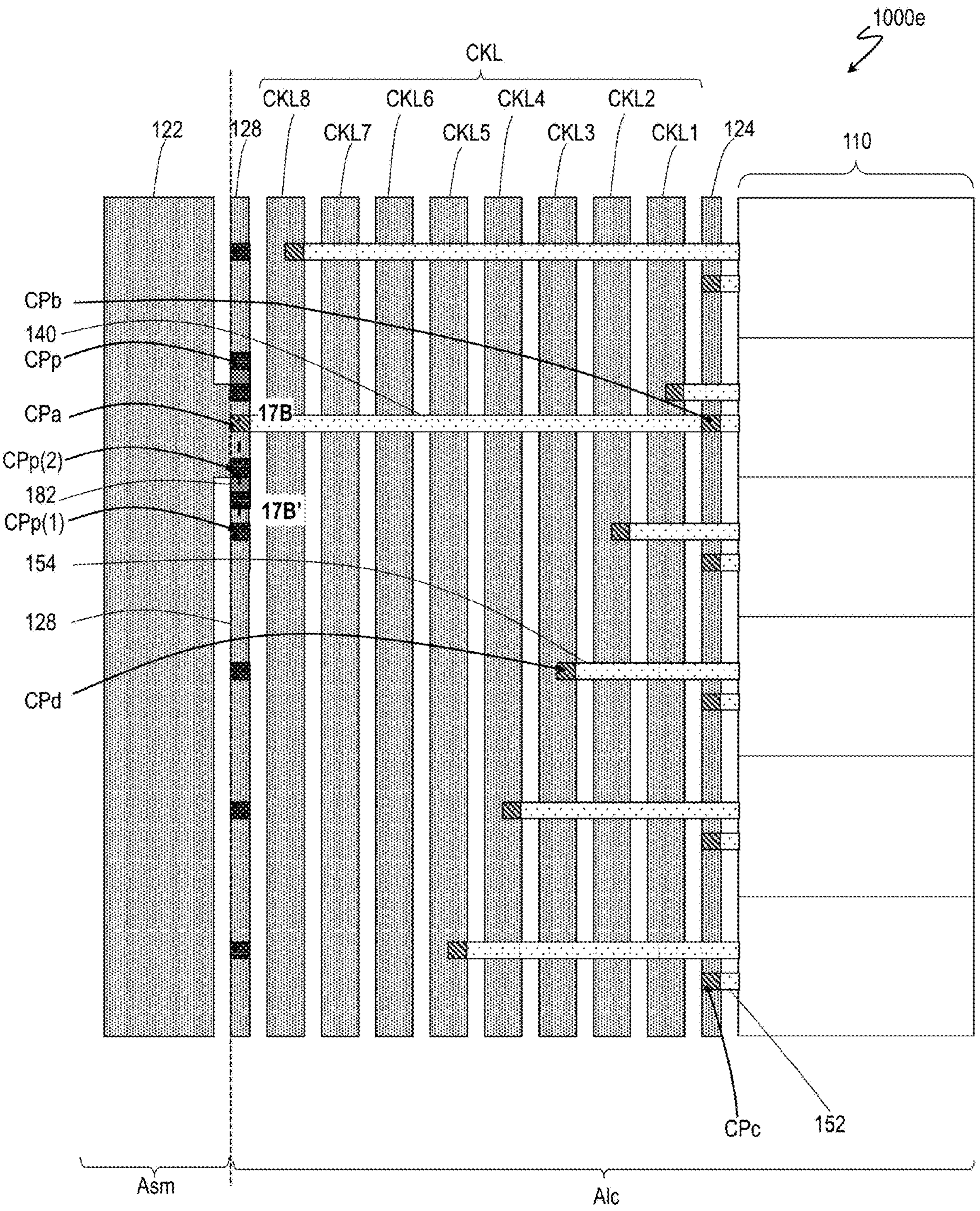
FIG. 17A is a schematic plan view of a display panel 1000*e* of a display device according to a fifth embodiment and plan view illustrating a portion of a peripheral region NA.
Figure 17B:
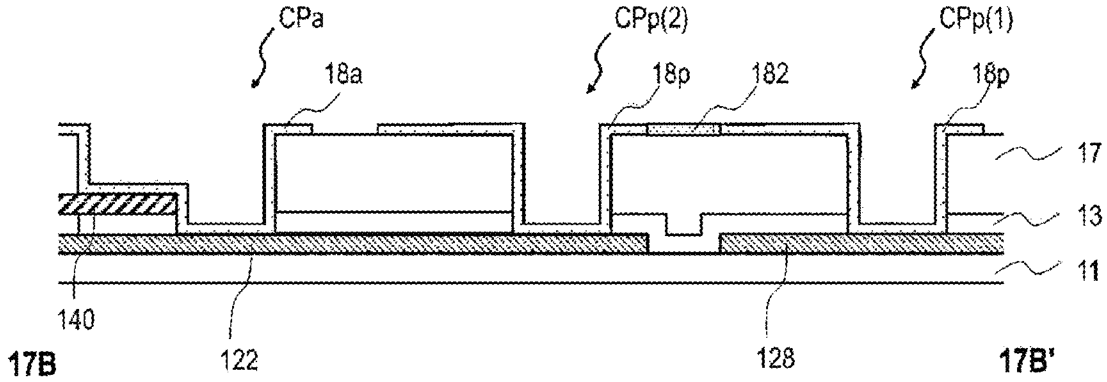
FIG. 17B is a cross-sectional view schematically illustrating the display panel 1000*e* and cross-sectional view taken along the line 17B-17B' in FIG. 17A.

A display panel 1000*e* included in a display device according to the present embodiment will now be described with reference to FIGS. 17A and 17B. FIG. 17A is a schematic plan view of the display panel 1000*e* and plan view schematically illustrating a portion of a peripheral region NA. FIG. 17B is a cross-sectional view schematically illustrating the display panel 1000*e* and cross-sectional view taken along the line 17B-17B' in FIG. 17A. The following mainly describes differences from the previous embodiment.

The display panel 1000*e* is different from the display panel 1000*c* in that the former further includes a second connecting portion 182 which is formed of a transparent conductive material and electrically connects the island-shaped conductive portion 128 and the outer trunk line 122. The second connecting portion 182 may be included in, for example, the same conductive layer (that is, the third conductive layer) as pixel electrodes 5 included in a plurality of pixels P.

Also in the display device having the display panel 1000*e*, by including the third contact portion CPp, the occurrence of ESD in the first contact portion CPa and the second contact portion CPd and the occurrence of defects caused by the ESD are minimized, as in the display device having the display panel 1000*c*.

In the display panel 1000*e*, the third conductive portion 18*p* is electrically connected to the island-shaped conductive portion 128 in the third contact hole CHp, and the island-shaped conductive portion 128 is electrically connected to the outer trunk line 122 via the second connecting portion 182. Since the second connecting portion 182 is formed of a transparent conductive material, the electric resistance value is higher than when the second connecting portion is formed of a conductive material forming the gate metal layer or the source metal layer, for example. Thus, in the display panel 1000*e*, the electric resistance value between the third portion R12*e*3 exposed in each third contact hole CHp and each of the plurality of first branch wiring lines 140 is higher than the electric resistance value between the first portion R12*e*1 exposed in each first contact hole CHa and the first branch wiring line 140 electrically connected to the first portion R12*e*1 in the first contact hole CHa.

In the display panel 1000*e*, when ESD occurs in the third conductive portion 18*p* of the third contact portion CPp provided on the island-shaped conductive portion 128, the second connecting portion 182 having a relatively high electric resistance value may generate heat and burn out due to charge discharged to the third conductive portion 18*p*. In such a case, the influence of the ESD that occurred in the third conductive portion 18*p* on the gate drive circuit GD via the first branch wiring line 140 can be further reduced. For example, one or more second connecting portions 182 may be provided for each of the island-shaped conductive portions 128.

The plurality of third contact portions CPp included in the display panel 1000*e* include a third contact portion CPp (1) provided on the island-shaped conductive portion 128 and a third contact portion CPp (2) provided on the outer trunk line 122. Since the third conductive portion 18*p* included in the third contact portion CPp (1) and the third conductive portion 18*p* included in the third contact portion CPp (2) are electrically connected to each other by the second connecting portion 182, the island-shaped conductive portion 128 and the outer trunk line 122 can be electrically connected to each other. The third conductive portion 18*p* included in the third contact portion CPp (1), the third conductive portion 18*p* included in the third contact portion CPp (2), and the second connecting portion 182 may be integrally (continuously) formed.

The display panel 1000*e* may further include, for example, a first connecting portion such as, the first connecting portion 148 included in the display panel 1000*d*, which electrically connects the third conductive portions 18*p* of two or more third contact portions CPp. In particular, when the display panel 1000*e* further includes a first connecting portion electrically connecting two or more third conductive portions 18*p* electrically connected to different island-shaped conductive portions 128 among the plurality of third conductive portions 18*p* of the display panel, there is no need to provide the second connecting portion 182 for each of all the island-shaped conductive portions 128, and one or more second connecting portions 182 may be provided for the island-shaped conductive portions 128 electrically connected to each other by the first connecting portions.

Sixth Embodiment

Figure 18:
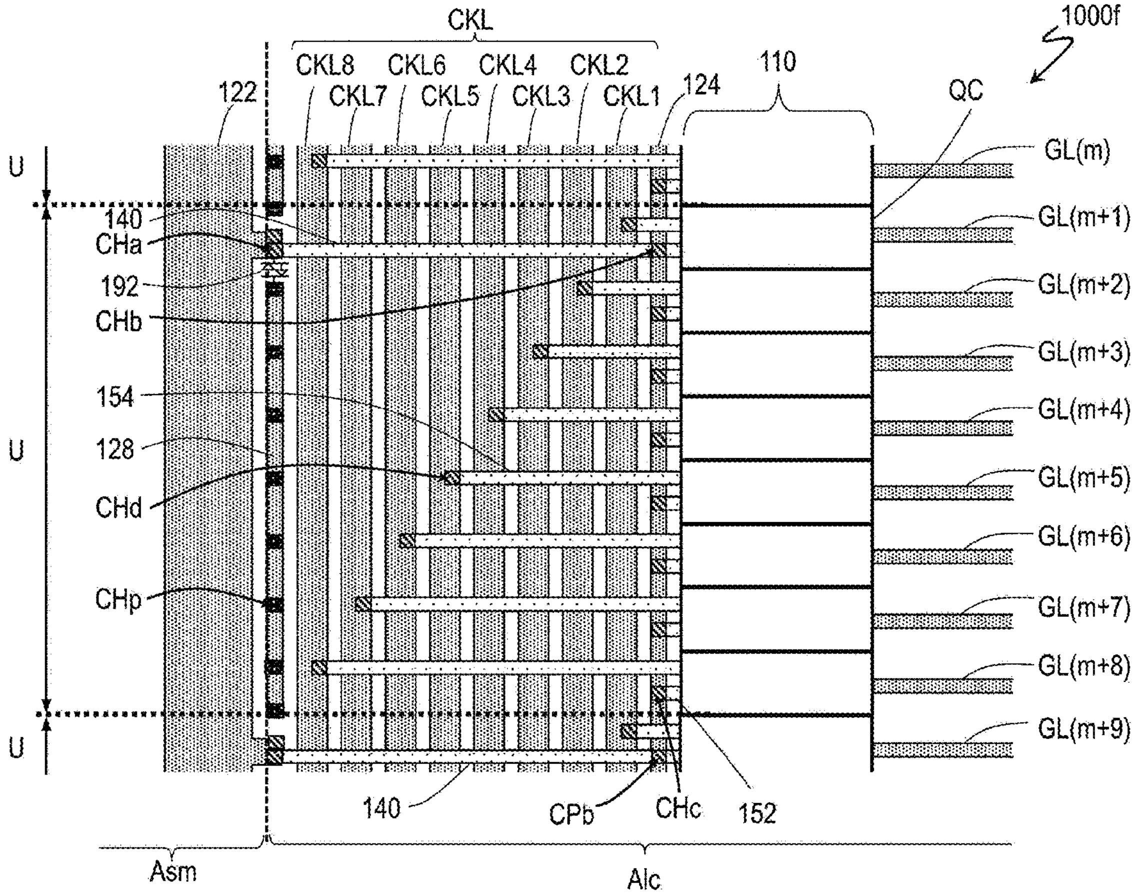
FIG. 18 is a schematic plan view of a display panel 1000*f* of a display device according to a sixth embodiment and plan view illustrating a portion of a peripheral region NA.

A display panel 1000*f* included in a display device according to the present embodiment will now be described with reference to FIG. 18. FIG. 18 is a schematic plan view of the display panel 1000*f* and plan view schematically illustrating a portion of a peripheral region NA. The following mainly describes differences from the previous embodiment.

The display panel 1000*f* is different from the display panel 1000*c* in that the former further includes an ESD protection circuit 192 electrically connected to the island-shaped conductive portion 128 and the outer trunk line 122. Since the display panel 1000*f* includes the ESD protection circuit 192, the outer trunk line 122, the first branch wiring line 140, and the gate drive circuit GD can be protected from ESD that occurred in the third contact portion CPp (the third conductive portion 18*p* when the third contact portion CPp includes the third conductive portion 18*p*) provided on the island-shaped conductive portion 128. Here, a diode ring 192 is provided as the ESD protection circuit 192. The diode ring 192 includes two diode elements connected in parallel such that forward directions thereof are opposite to each other between the island-shaped conductive portion 128 and the outer trunk line 122. For example, one or more ESD protection circuits 192 may be provided for each of the island-shaped conductive portions 128.

Also in the display device having the display panel 1000*f*, by including the third contact portion CPp, the occurrence of ESD in the first contact portion CPa and the second contact portion CPd and the occurrence of defects caused by the ESD are minimized, as in the display device having the display panel 1000*c*.

The display panel 1000*f* may further include, for example, a first connecting portion such as the first connecting portion 148 included in the display panel 1000*d*, which electrically connects the third conductive portions 18_p_ of two or more third contact portions CPp. In particular, when the display panel 1000_f_ further includes a first connecting portion electrically connecting two or more third conductive portions 18_p_ electrically connected to different island-shaped conductive portions 128 among the plurality of third conductive portions 18_p_ of the display panel, there is no need to provide the ESD protection circuit 192 for each of all the island-shaped conductive portions 128, and one or more ESD protection circuits 192 may be provided for the island-shaped conductive portions 128 electrically connected to each other by the first connecting portions.

First Modified Example

Figure 19:
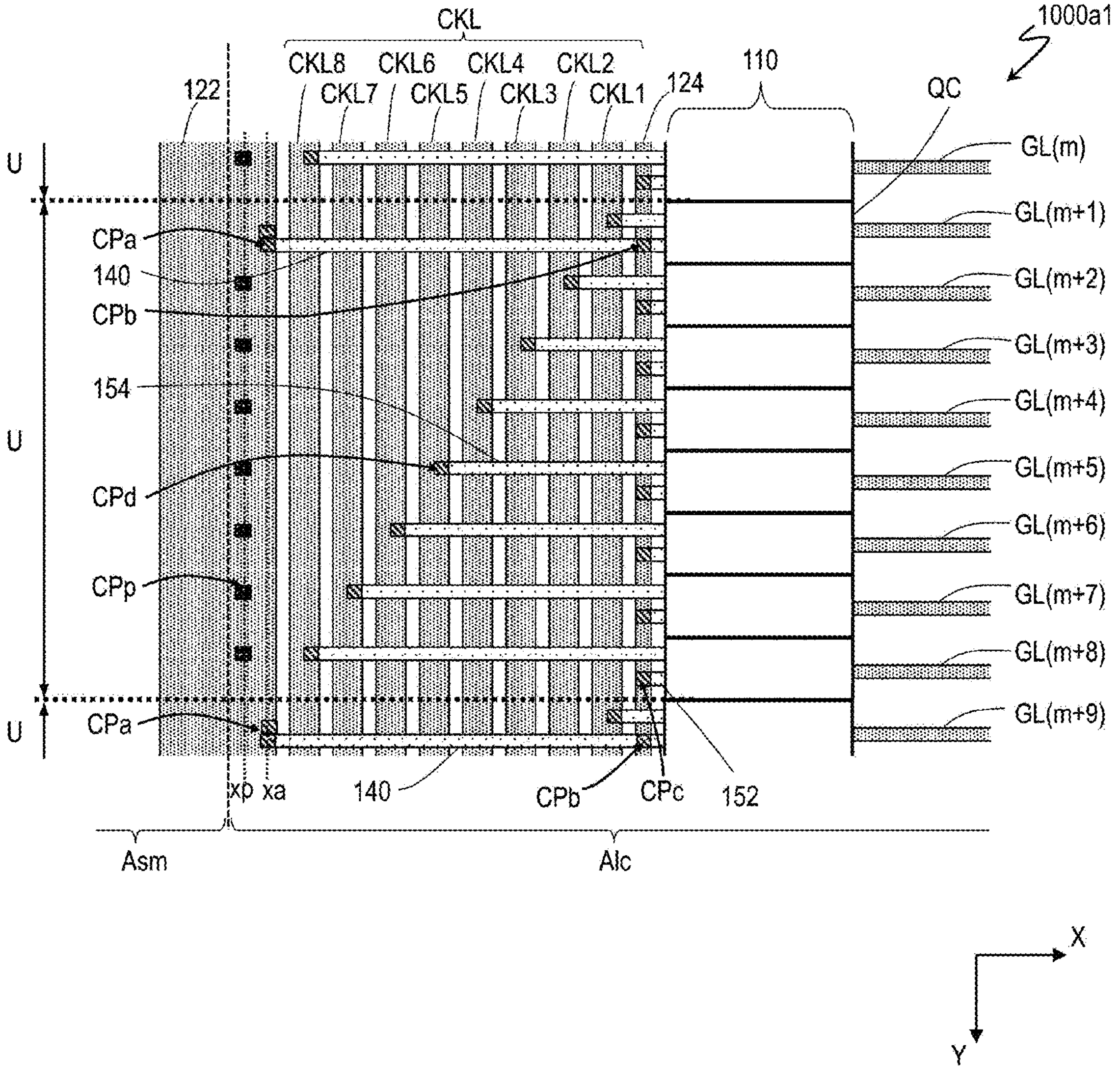
FIG. 19 is a schematic plan view of a display panel 1000*a*1 of a display device according to a first modified example of the first embodiment and plan view schematically illustrating a portion of a peripheral region NA.

A first modified example of the display panel 1000_a_ according to the first embodiment will now be described with reference to FIG. 19. FIG. 19 is a schematic plan view of a display panel 1000_a_1 included in a display device according to the first modified example of the first embodiment and plan view schematically illustrating a portion of a peripheral region NA. The following mainly describes differences from the display panel 1000_a_ of the first embodiment. Note that the first modified example is not limited to the first embodiment and may be applied to any of the above-described embodiments.

The display panel 1000_a_1 is different from the display panel 1000_a_ in that the arrangement position xp of the third contact portions CPp in the row direction (e.g., the arrangement position of the third contact holes CHp in the row direction) is farther from the display region AA than the arrangement position xa of the first contact portion CPa in the row direction (e.g., the arrangement position of the first contact hole CHa in the row direction).

Also in the display device having the display panel 1000_a_1, by including the third contact portions CPp, the occurrence of ESD in the first contact portions CPa and the second contact portions CPd and the occurrence of defects caused by the ESD are minimized, as in the display device having the display panel 1000_a_.

In the display device having the display panel 1000_a_1, the third contact portions CPp are arranged farther from the display region AA in the row direction than the first contact portions CPa. That is, since the third contact portions CPp are in a shorter distance from an end of the counter substrate 201 in the row direction than the first contact portions CPa, ESD can be effectively induced toward the third contact portions CPp (the third conductive portions 18_p_ when the third contact portions CPp includes the third conductive portions 18_p_), and the effect of minimizing the occurrence of ESD in the first contact portions CPa is greater than that of the display panel 1000_a_.

Second Modified Example

Figure 20:
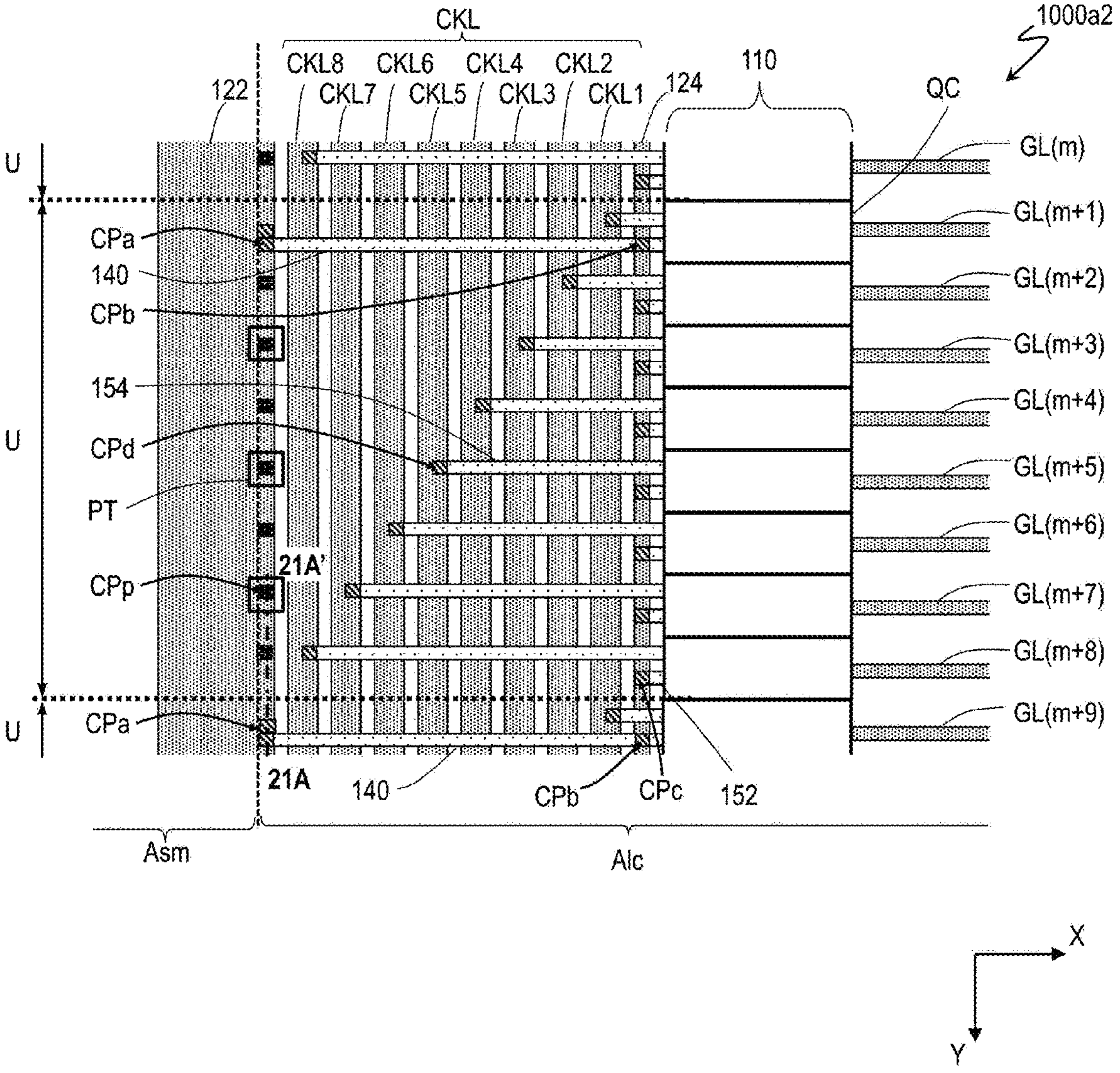
FIG. 20 is a schematic plan view of a display panel 1000*a*2 of a display device according to a second modified example of the first embodiment and plan view schematically illustrating a portion of a peripheral region NA.
Figure 21:
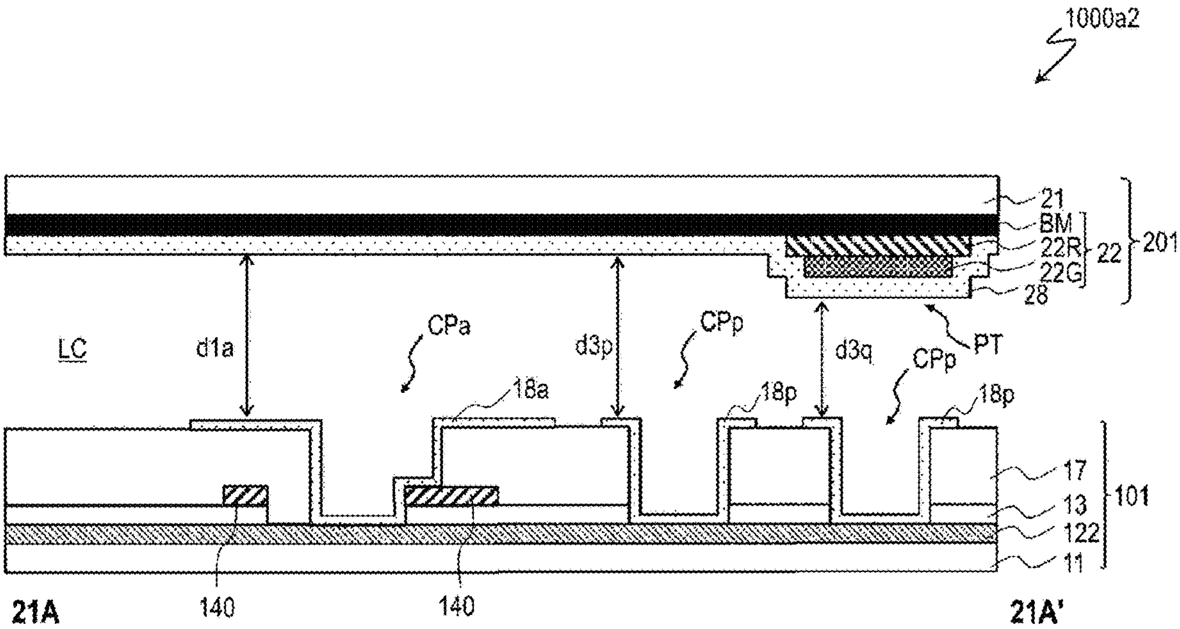
FIG. 21 is a cross-sectional view schematically illustrating the display panel 1000*a*2 and cross-sectional view taken along the line 21A-21A' in FIG. 20.

A second modified example of the display panel 1000_a_ according to the first embodiment will be described with reference to FIGS. 20 and 21. FIG. 20 is a schematic plan view of a display panel 1000_a_2 included in a display device according to the second modified example of the first embodiment and plan view schematically illustrating a portion of a peripheral region NA. FIG. 21 is a cross-sectional view schematically illustrating the display panel 1000_a_2 and cross-sectional view taken along the line 21A-21A' in FIG. 20. The following mainly describes differences from the display panel 1000_a_ of the first embodiment. Note that the second modified example is not limited to the first embodiment and may be applied to any of the above-described embodiments.

The display panel 1000_a_2 is different from the display panel 1000_a_ in that the counter substrate 201 includes one or more projecting structures PT which is provided at a position facing the third contact portion CPp (that is, provided at a position facing the third contact hole CHp) and projects toward the TFT substrate 101.

Also in the display device having the display panel 1000_a_2, by including the third contact portion CPp, the occurrence of ESD in the first contact portion CPa and the second contact portion CPd and the occurrence of defects caused by the ESD are minimized, as in the display device having the display panel 1000_a_.

In the display device having the display panel 1000_a_2, the projecting structures PT are provided to face the third contact portions CPp. A distance d3_q_ from the counter substrate 201 provided with the facing projecting structure PT to the third contact portion CPp (the third conductive portion 18_p_ in the example of FIG. 21) is shorter than a distance d1_a_ from the counter substrate 201 to the first contact portion CPa (the first conductive portion 18_a_ in the example of FIG. 21). Therefore, ESD can be effectively induced toward the third contact portion CPp (e.g., the third conductive portion 18_p_), and the effect of minimizing the occurrence of ESD in the first contact portion CPa is greater than that in the display panel 1000_a_.

In the example of FIG. 21, the projecting structure PT is formed of the same material (color resists) as that of the color filters included in the color filter layer 22. That is, the projecting structure PT is formed of the same dielectric film as the color filters of the color filter layer 22. For example, the color filter layer 22 includes a first color filter, a second color filter, and a third color filter that transmit light of different colors. In this example, the projecting structure PT includes a first portion 22R formed of the same dielectric film as the first color filter and a second portion 22G formed of the same dielectric film as the second color filter. The projecting structure PT may further include a third portion formed of the same dielectric film as the third color filter. The material and structure of the projecting structure are not limited to the above examples.

The display panel 1000_a_2 may include a plurality of projecting structures PT. The plurality of projecting structures PT may be provided corresponding to each of a plurality of third contact portions CPp included in the display panel 1000_a_2, or may be provided corresponding to any two or more third contact portions CPp among a plurality of third contact portions CPp included in the display panel 1000_a_2.

Although an example in which the third contact holes CHp (the third contact portions CPp) are arranged such that the ranges of the third portion in the row direction and the column direction, the third portion exposed from the third contact hole CHp, overlap the ranges of the outer trunk line 122 in the row direction and the column direction, the outer trunk line supplying the first signal (e.g., the signal for applying the low-level potential Vgl) for applying fixed potential to a plurality of stages of the shift register has been described in the above-described embodiment, the disclosure is not limited thereto. For example, the third contact holes CHp (third contact portions CPp) may be arranged such that the ranges of the third portion in the row direction and the column direction, the third portion exposed by the third contact hole CHp overlap the ranges of a trunk line in the row direction and the column direction, the trunk line other than the outer trunk line 122 provided in the peripheral region and extending in the column direction (e.g., a clock trunk line that supplies a clock signal to one or more stages of a plurality of stages of a shift register, and in this case, the first signal corresponds to the clock signal). Also in this case, since ESD can be induced at the interface with respect to the third contact portion CPp, the probability and frequency of the occurrence of ESD at the interface with respect to another contact portion can be reduced, and the occurrence of defects caused by ESD is minimized.

INDUSTRIAL APPLICABILITY

The display device according to the embodiments of the disclosure is widely applied to active matrix display panels. In the display device according to an embodiment of the disclosure, the occurrence of defects caused by ESD is minimized, and manufacturing yield can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device including a plurality of pixels arrayed in a matrix shape with a plurality of pixel rows and a plurality of pixel columns, the display device comprising:

a display region defined by the plurality of pixels, and a peripheral region other than the display region;

a gate drive circuit provided in the peripheral region and including a shift register including a plurality of stages corresponding to the plurality of pixel rows, respectively;

a first trunk line provided in the peripheral region, extending in a column direction, and configured to supply a first signal to any one or more of the plurality of stages of the shift register;

one or more first branch wiring lines provided in the peripheral region and electrically connected to the first trunk line;

one or more first contact holes through which a first portion of the first trunk line and a first portion of a corresponding first branch wiring line of the one or more first branch wiring lines are exposed; and one or more third contact holes through which a third portion of a conductive portion included in a first conductive layer is exposed, wherein the first trunk line is included in the first conductive layer, the one or more first branch wiring lines are included in a second conductive layer, in each of the one or more first contact holes, the first portion of the first trunk line and the first portion of a corresponding first branch wiring line of the one or more first branch wiring lines are electrically connected to each other, a range of the third portion in a row direction overlaps a range of the first trunk line in the row direction, and a range of the third portion in the column direction overlaps a range of the first trunk line in the column direction, and an electric resistance value between the third portion and a first branch wiring line of the one or more first branch wiring lines is higher than an electric resistance value between the first portion of the first trunk line and the first branch wiring line connected to the first portion of the first trunk line.

2. The display device according to claim 1, further comprising:

a second trunk line provided in the peripheral region, extending in the column direction, and configured to supply the first signal to any one or more of the plurality of stages of the shift register;

another trunk line provided in the peripheral region, extending in the column direction, and configured to supply a second signal to any one or more of the plurality of stages of the shift register;

one or more second branch wiring lines provided in the peripheral region and electrically connected to the other trunk line; and one or more second contact holes through which a second portion of the other trunk line and a second portion of a corresponding second branch wiring line of the one or more second branch wiring lines are exposed, wherein the one or more first branch wiring lines electrically connect the first trunk line and the second trunk line, the first trunk line is disposed farther from the display region than each of the second trunk line and the other trunk line is from the display region, the second trunk line and the other trunk line are included in the first conductive layer, the one or more second branch wiring lines are included in the second conductive layer, and the second portion of the other trunk line is electrically connected to the second portion of a corresponding second branch wiring line of the one or more second branch wiring lines in each of the one or more second contact holes.

3. The display device according to claim 2, further comprising:

one or more first conductive portions provided corresponding to the one or more first contact holes, each of the one or more first conductive portions being electrically connected to the first portion of the first trunk line and the first portion of a corresponding first branch wiring line of the one or more first branch wiring lines;

one or more second conductive portions provided corresponding to the one or more second contact holes, each of the one or more second conductive portions being electrically connected to the second portion of the other trunk line and the second portion of a corresponding second branch wiring line of the one or more second branch wiring lines; and one or more third conductive portions provided corresponding to the one or more third contact holes, each of the one or more third conductive portions being electrically connected to the third portion, wherein the one or more first conductive portions, the one or more second conductive portions, and the one or more third conductive portions are included in a third conductive layer.

4. The display device according to claim 1, wherein the one or more first branch wiring lines are a plurality of first branch wiring lines, the one or more first contact holes are a plurality of first contact holes formed corresponding to the plurality of first branch wiring lines, respectively, the one or more third contact holes are a plurality of third contact holes, and the number of the plurality of third contact holes is greater than the number of the plurality of first contact holes.

5. The display device according to claim 4, wherein, when an arrangement position of each of the plurality of first contact holes in the column direction is set as a first position and an arrangement position of each of the plurality of third contact holes in the column direction is set as a third position, the plurality of first contact holes and the plurality of third contact holes are formed in a manner that a plurality of the third positions is present, in the column direction, between two of the first positions adjacent to each other.

6. The display device according to claim 1, further comprising:

one or more first conductive portions provided corresponding to the one or more first contact holes, each of the one or more first conductive portions being electrically connected to the first portion of the first trunk line and the first portion of a corresponding first branch wiring line of the one or more first branch wiring lines; and one or more third conductive portions provided corresponding to the one or more third contact holes, each of the one or more third conductive portions being electrically connected to the third portion, wherein the one or more first conductive portions and the one or more third conductive portions are included in a third conductive layer.

7. The display device according to claim 6, wherein the one or more first conductive portions and the one or more third conductive portions are formed of a transparent conductive material.

8. The display device according to claim 6, wherein a gate electrode of a TFT included in each of the plurality of pixels is included in the first conductive layer, a source electrode of the TFT included in each of the plurality of pixels is included in the second conductive layer, and a pixel electrode included in each of the plurality of pixels is included in the third conductive layer.

9. The display device according to claim 6, further comprising:

a first substrate and a second substrate arranged facing each other;

a liquid crystal layer provided between the first substrate and the second substrate; and a sealing portion surrounding the liquid crystal layer, wherein the one or more first conductive portions and the one or more third conductive portions do not overlap the sealing portion in a plan view.

10. The display device according to claim 9, wherein the first substrate includes the first conductive layer, the second conductive layer, and the third conductive layer; and the second substrate includes one or more projecting structures provided facing a corresponding third contact hole of the one or more third contact holes, the one or more projecting structures projecting toward the first substrate.

11. The display device according to claim 6, wherein the third portion is a part of the first trunk line, the one or more third conductive portions are a plurality of third conductive portions, and the display device further comprises a connecting portion included in the second conductive layer and electrically connecting two or more third conductive portions among the plurality of third conductive portions.

12. The display device according to claim 11, wherein the connecting portion overlaps the first trunk line in a plan view.

13. The display device according to claim 11, wherein the connecting portion electrically connects the two or more third conductive portions to any one of the one or more first conductive portions.

14. The display device according to claim 6, wherein the first trunk line includes one or more notched portions, the display device further comprises one or more island-shaped conductive portions included in the first conductive layer and disposed, separated from the first trunk line, in a corresponding notched portion of the one or more notched portions, the third portion is a part of the one or more island-shaped conductive portions, the one or more third conductive portions are a plurality of third conductive portions, and the display device further comprises a first connecting portion included in the second conductive layer and electrically connecting two or more third conductive portions among the plurality of third conductive portions.

15. The display device according to claim 14, wherein the first connecting portion at least partially overlaps the one or more island-shaped conductive portions and at least partially overlaps the first trunk line, in a plan view.

16. The display device according to claim 14, wherein the one or more notched portions are a plurality of notched portions, the one or more island-shaped conductive portions are a plurality of island-shaped conductive portions disposed in the plurality of notched portions, respectively, and the first connecting portion electrically connects two or more third conductive portions electrically connected to different island-shaped conductive portions of the plurality of island-shaped conductive portions, among the plurality of third conductive portions.

17. The display device according to claim 1, wherein an arrangement position of each of the one or more third contact holes in the row direction is farther from the display region than an arrangement position of each of the one or more first contact holes in the row direction is from the display region.

18. The display device according to claim 1, wherein the third portion is a part of the first trunk line, and in each of the one or more third contact holes, the third portion is not connected to any conductive portion included in the second conductive layer.

19. The display device according to claim 1, wherein the first trunk line includes one or more notched portions, the display device further comprises one or more island-shaped conductive portions included in the first conductive layer and disposed, separated from the first trunk line, in a corresponding notched portion of the one or more notched portions, and the third portion is a part of the one or more island-shaped conductive portions.

20. The display device according to claim 19, wherein, in each of the one or more third contact holes, the third portion is not connected to any conductive portion included in the second conductive layer.

21. The display device according to claim 19, further comprising:

a second connecting portion formed of a transparent conductive material and electrically connecting the one or more island-shaped conductive portions and the first trunk line.

22. The display device according to claim 19, further comprising:

an ESD protection circuit electrically connected to the one or more island-shaped conductive portions and the first trunk line.

* * * * *